United States Patent
Ozgen et al.

(10) Patent No.: US 7,075,581 B1
(45) Date of Patent: Jul. 11, 2006

(54) INTERLACED-TO-PROGRESSIVE SCAN CONVERSION BASED ON FILM SOURCE DETECTION

(75) Inventors: Mustafa Ozgen, East Palo Alto, CA (US); Kyoung-Won Lim, Austin, TX (US)

(73) Assignee: Zoran Corporation, Sunnyvale, CA (US)

( * ) Notice: Subject to any disclaimer, the term of this patent is extended or adjusted under 35 U.S.C. 154(b) by 636 days.

(21) Appl. No.: 10/453,964

(22) Filed: Jun. 3, 2003

(51) Int. Cl.
*H04N 7/01* (2006.01)
*H04N 14/20* (2006.01)

(52) U.S. Cl. .................. 348/448; 348/452; 348/451; 348/441; 348/911

(58) Field of Classification Search .............. 348/448, 348/451, 452, 456, 441, 446, 459, 911, 97, 348/620, 669, 431.1, 416.1, 402.1, 412.1, 348/415.1; 382/236; 386/131; 375/240.01, 375/240.16
See application file for complete search history.

(56) References Cited

U.S. PATENT DOCUMENTS

| | | | |
|---|---|---|---|
| 4,982,280 A | 1/1991 | Lyon et al. | |
| 5,317,398 A | 5/1994 | Casavant et al. | |
| 5,398,071 A | 3/1995 | Gove et al. | |
| 5,428,397 A * | 6/1995 | Lee et al. | 348/448 |
| 5,596,371 A * | 1/1997 | Pakhchyan et al. | 348/452 |
| 5,828,786 A * | 10/1998 | Rao et al. | 382/236 |
| 6,014,182 A | 1/2000 | Swartz | |
| 6,034,733 A * | 3/2000 | Balram et al. | 348/448 |
| 6,055,018 A * | 4/2000 | Swan | 348/448 |
| 6,157,412 A | 12/2000 | Westerman et al. | |
| 6,262,773 B1 * | 7/2001 | Westerman | 348/448 |
| 6,297,848 B1 * | 10/2001 | Westerman | 348/448 |
| 6,317,165 B1 * | 11/2001 | Balram et al. | 348/699 |
| 6,408,024 B1 * | 6/2002 | Nagao et al. | 375/240.01 |
| 6,430,223 B1 * | 8/2002 | Lim | 375/240.16 |
| 6,509,930 B1 * | 1/2003 | Hirano et al. | 348/452 |
| 6,577,345 B1 * | 6/2003 | Lim et al. | 348/452 |
| 6,606,126 B1 * | 8/2003 | Lim et al. | 348/452 |
| 6,614,484 B1 * | 9/2003 | Lim et al. | 348/448 |
| 6,757,022 B1 * | 6/2004 | Wredenhagen et al. | 348/452 |
| 6,897,903 B1 * | 5/2005 | Hu | 348/700 |
| 6,930,728 B1 * | 8/2005 | Rhee | 348/448 |
| 6,940,557 B1 * | 9/2005 | Handjojo et al. | 348/452 |
| 6,989,870 B1 * | 1/2006 | Numata | 348/448 |
| 7,006,148 B1 * | 2/2006 | Nagata | 348/448 |
| 7,027,099 * | 4/2006 | Thompson et al. | 348/448 |
| 2002/0135697 A1 * | 9/2002 | Wredenhagen et al. | 348/448 |

* cited by examiner

*Primary Examiner*—David Ometz
*Assistant Examiner*—Jean W. Désir
(74) *Attorney, Agent, or Firm*—Blakely, Sokoloff, Taylor & Zafman LLP

(57) ABSTRACT

A method for deinterlacing a video signal is disclosed. Frame differences are calculated, a scene change threshold is determined based on the frame differences, a scene change is detected based on the frame differences and the scene change threshold, a stationary motion threshold is determined based on the frame differences, stationary motion is detected based on the frame differences and the stationary motion threshold, a mode of the video signal is detected based on the frame differences, and a deinterlacing algorithm is selected based on the mode of the video signal, the scene change, and the stationary motion.

32 Claims, 20 Drawing Sheets

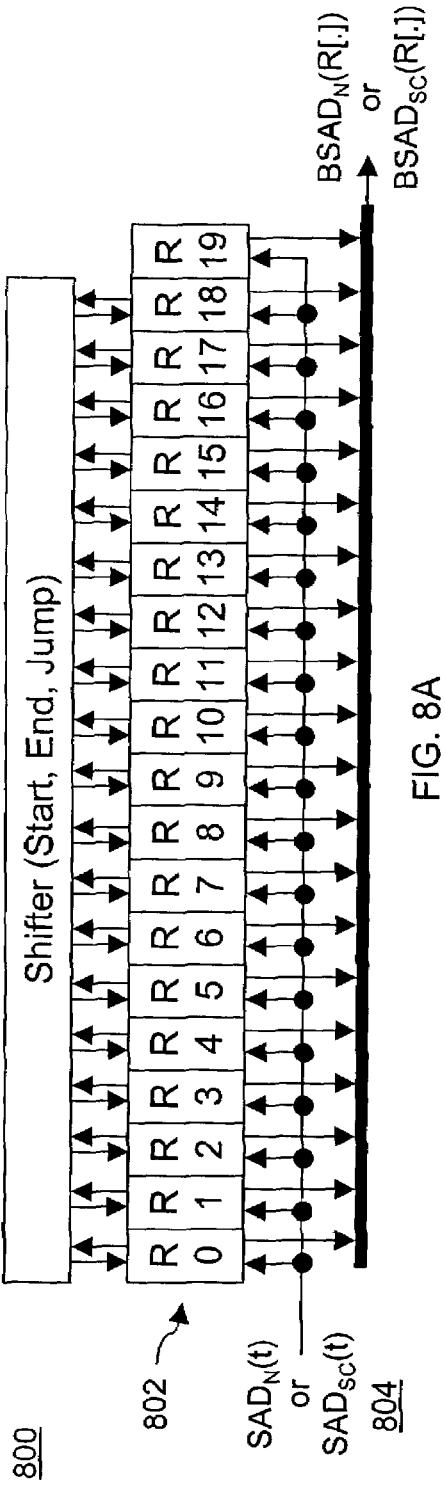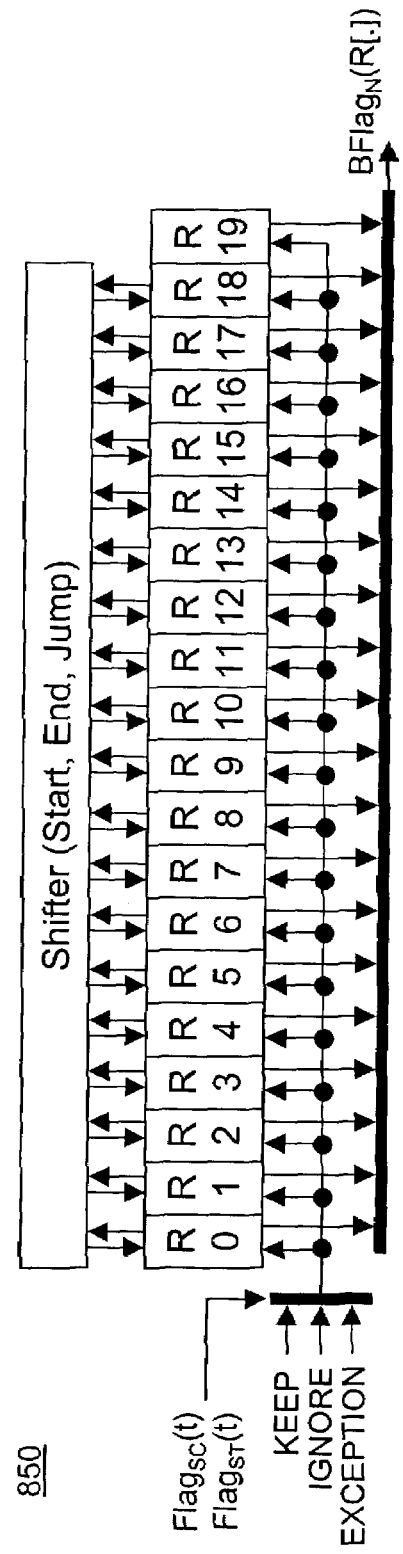
FIG. 8A
FIG. 8B

INTERLACED-TO-PROGRESSIVE SCAN CONVERSION BASED ON FILM SOURCE DETECTION

FIELD OF THE INVENTION

This disclosure relates generally to conversion of an interlaced signal to a progressive signal, and in particular relates to conversion of an interlaced signal to a progressive signal based on film source detection.

BACKGROUND OF THE INVENTION

As the high definition (HD) display format becomes more popular, consumers are purchasing high definition equipment, such as HD displays and HD set top boxes, to view high quality content. However, most content is currently available only in standard resolution interlaced video, and needs to be converted to be displayed in an HD format. For example, a typical home theater system may be based on Digital Video Disc (DVD) materials. In a home theater system, low-resolution video sequences are reconstructed by decoding MPEG compressed video streams, then further processed with special signal processing circuitry that performs video up-scaling.

A special situation arises when interlaced video originating from film sources are converted to progressive frames. Film sources, such as motion pictures, are truly progressive in nature, since film comprises numerous still images displayed in rapid succession to create the illusion of motion. For example, typical films shown in movie theaters are displayed at approximately 24 frames per second (actually 23.976 frames per second). To display progressive film content in the NTSC format of approximately 60 interlaced fields per second (actually 59.94 fields per second), the film is converted to an interlaced format using a technique known as 3:2 pulldown. Once the film is converted to an interlaced format, the interlaced format may be converted to a high definition format.

SUMMARY OF THE INVENTION

A method for deinterlacing a video signal is disclosed. Frame differences are calculated, a scene change threshold is determined based on the frame differences, a scene change is detected based on the frame differences and the scene change threshold, a stationary motion threshold is determined based on the frame differences, stationary motion is detected based on the frame differences and the stationary motion threshold, a mode of the video signal is detected based on the frame differences, and a deinterlacing algorithm is selected based on the mode of the video signal, the scene change, and the stationary motion.

BRIEF DESCRIPTION OF THE DRAWINGS

FIG. 8A shows an embodiment of a SAD buffer.

FIG. 8B shows an embodiment of a flag buffer.

Figure 1:
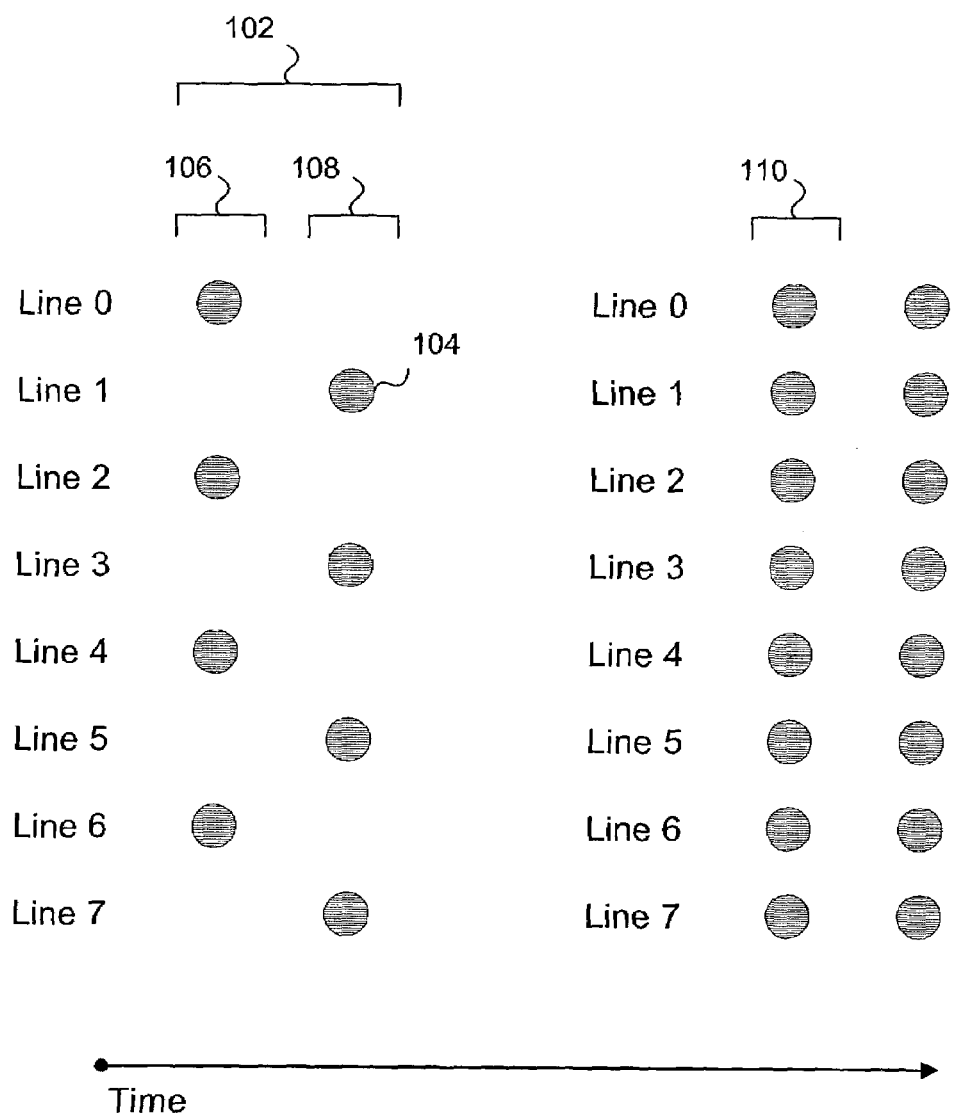
FIG. 1 shows an embodiment of interlaced and progressive video frames.

While the present invention is subject to various modifications and alternative forms, specific embodiments thereof have been shown by way of example in the drawings and will herein be described in detail. The present invention should be understood to not be limited to the particular forms disclosed, but on the contrary, the present intention is to cover all modifications, equivalents, and alternatives falling within the spirit and scope of the invention.

DETAILED DESCRIPTION

In the following description numerous specific details are set forth, such as specific examples of data signals, named components, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention. Thus, the specific details set forth are merely exemplary.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 shows interlaced 102 and progressive 110 video frames. In an interlaced video frame 102, each frame 102 of pixels 104 is composed of two time sequential fields, an even field 106 and an odd field 108, as illustrated in FIG. 1. To display an SD interlaced video signal with high visual quality on a progressive scan display or on an HD display at a higher resolution (in either an interlaced or progressive format), it is necessary to convert the interlaced even 106 and odd 108 fields of the video signal into a sequentially continuous progressive frame 110 of pixels 104 without interline gaps. This interlaced-to-progressive scan format conversion is known as deinterlacing.

Compared to a full progressive frame 110 of successive lines without missing lines of pixels 104, each field 106, 108 is subsampled by a factor of two in the vertical dimension, so that, as illustrated in FIG. 1, an even field 106 contains data at only even-numbered line locations (e.g. lines 0, 2, 4, 6), and an odd field 108 contains data at only odd-numbered line locations (e.g. lines 1, 3, 5, 7). Thus, an even field 106 has no pixels 104 in odd numbered lines of the full frame 102, and an odd field 108 has no pixels 104 in even numbered lines of the full frame 102.

Figure 2:
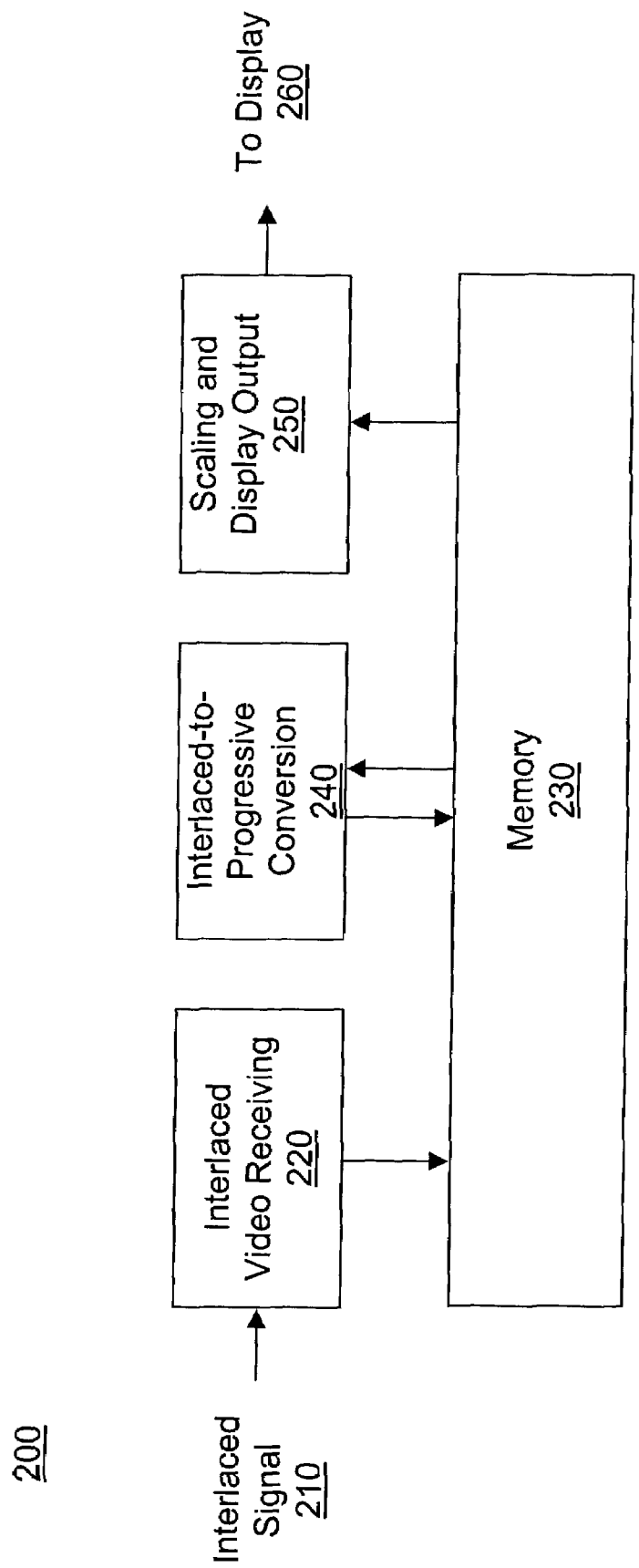
FIG. 2 shows processing flow for an embodiment of an interlaced to progressive scan conversion system.

Processing flow of an embodiment of an interlaced-to-progressive scan conversion system 200 is shown in FIG. 2. The interlaced video receiving block 220 receives an interlaced signal 210, such as from an National TV Standards Committee (NTSC), Advanced Television Systems Committee (ATSC), Phase Alternating Line (PAL), or Systeme En Couleur Avec Memoire (SECAM) decoder, and stores each field of the received signal 210 to different locations within memory 230. The interlaced signal 210 may be a video signal which may be in one of any of the following formats: analog TV, VHS, S-VHS, DTV, DV, DVD, HDTV, or D-VHS. The interlaced signal 210 may also be in other video formats. Furthermore, the interlaced signal 210 may be received from any of several sources, such as for example, an antenna receiving standard television broadcasts, high definition broadcasts, a satellite television receiver, a VHS tape, a DVD, a VCD, a laser disc, a video camera, or any other sources which may be used to transmit or store video.

In one embodiment, the interlaced-to-progressive scan conversion block 240 retrieves the fields of the interlaced signal 210 from the different locations within memory 230 and converts them to progressive frames, which are stored in memory 230. The scaling and display output block 250 retrieves a progressive frame from memory 230, upscales it to the active screen size of an external display device 260 and outputs the upscaled frame to the external display 260.

Throughout the video processing flow illustrated in FIG. 2, the two signal processing blocks 240 and 250 control the quality of the resulting progressive scan video. The interlaced-to-progressive conversion block 240 affects video quality since it depends on how well the interlaced-to-progressive scan conversion removes interlaced scan artifacts. Artifacts of interlaced scanning may distort an image. Such artifacts include visible scan line structure, deterioration of vertical resolution, line flickering caused by the rapid alternating of fields, feathering and line twitter. The scaling and display output block 250 controls the quality of the video by using high quality filters to convert the output of block 240 to higher screen resolutions, such as 720p or 1080i. In one embodiment, a standard definition 480i signal is deinterlaced using the present invention and displayed in high definition format, such as 480p, 720p, or 1080i.

As the newly emerging HD system adopts a plurality of standards for source and display formats, interlaced-to-progressive scan conversion is important as an intermediate procedure for up-converting SD source formats to HD display formats. For example, a SD display format may have a 640×480 horizontal by vertical resolution, a 4:3 aspect ratio, and a 30i interlaced frame rate; whereas a high definition (HD) display format may have a 1920×1080 horizontal by vertical resolution, a 16:9 aspect ratio, and a 30i interlaced frame rate or a 30p progressive scan frame rate. High definition formats include 480p, 720p, 1080i and 1080p.

Figure 3:
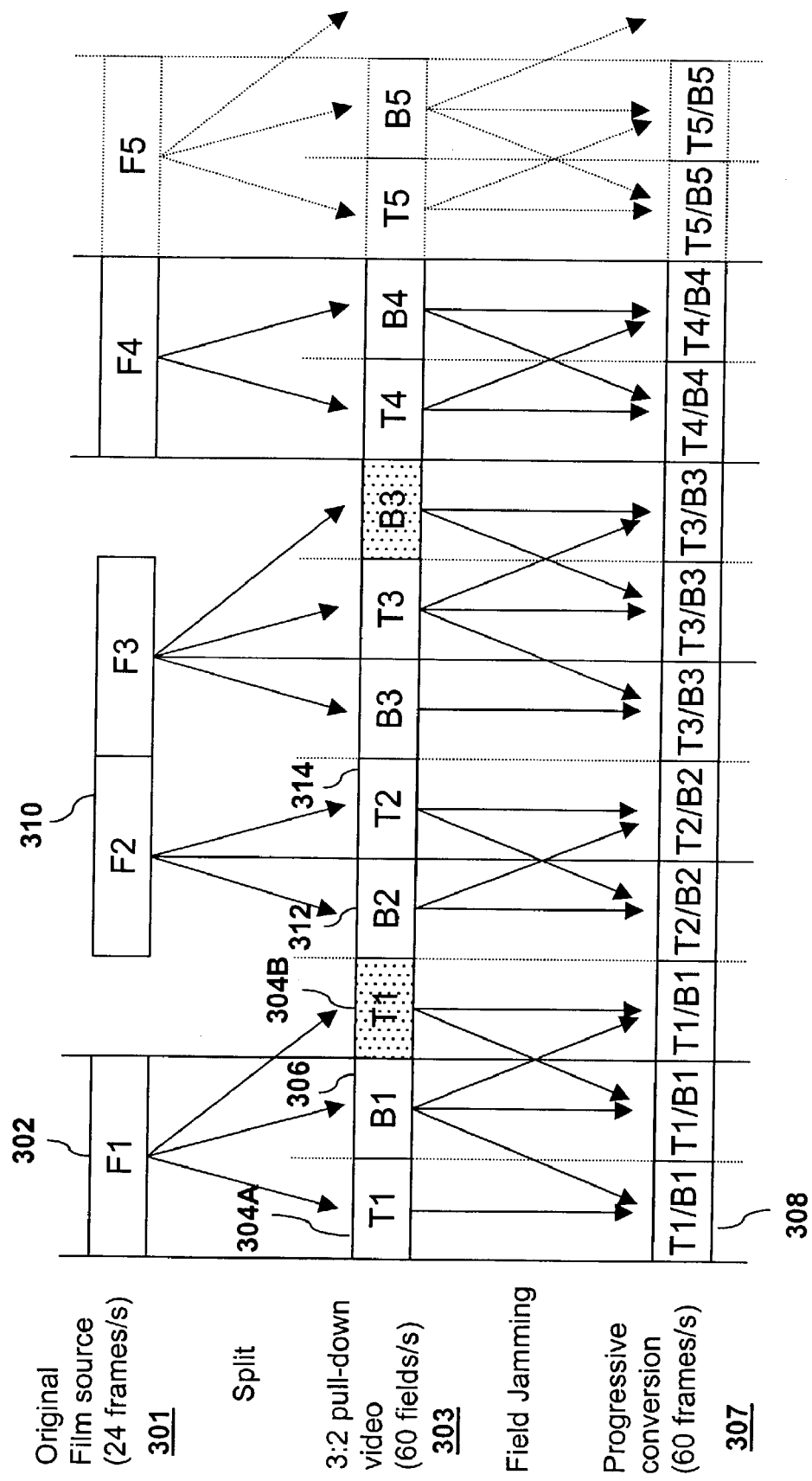
FIG. 3 shows embodiments of a 3:2 pulldown technique and a subsequent field jamming technique.

FIG. 3 shows an embodiment of a 3:2 pulldown technique and subsequent interlaced-to-progressive conversion of 3:2 pull down video using a field jamming technique. The 3:2 pulldown technique is used to convert 24 frames per second progressive film content to 60 fields per second interlaced video. An original film source 301 includes film frames 302, 310, 318, 326 and 334. In one embodiment, an original film source 301 is film such as that typically used for filming movies which are presented in movie theaters. Three consecutive interlaced video fields, for example, top field 304A, bottom field 306, and top field 304B are derived from a single film frame 302. Top field 304A is repeated to generate top field 304B. The subsequent two interlaced video fields, for example, bottom field 312 and top field 314, are derived from the next film frame 310. This field repetition pattern is called the 3:2 pull-down cadence, since 3:2 pull down video 303 is created using three fields (304A, 306, 304B) from a first film frame 302, and two fields (312, 314) from a next film frame 310.

Detection of a 3:2 pull-down cadence in incoming interlaced video may be used to reconstruct the original high quality progressive frames 307. For example, FIG. 3 shows one embodiment of a field jamming technique, wherein progressive frames are reconstructed from interlaced video fields. In one embodiment, progressive frame 308 is constructed by jamming interlaced top field 304A and bottom field 306. Field jamming is also known as "weave," and refers to a technique in which each progressive frame is constructed using the odd scan lines from one field and the even scan lines from the previous or next field (or vice versa). Since interlaced fields 304A and 306 are created from film frame 302, reconstructing frame 308 is less likely to result in a combing artifact (e.g. feathering, mice teeth), as is common in field jamming of video source fields. In field jamming with regular video source, there may be subject motion between the $\frac{1}{60}^{th}$ of a second when the fields were captured, resulting in a combing artifact when adjacent fields are weaved into a progressive frame. However, field jamming of fields 304A and 306 is less likely to result in combing, since fields 304A and 306 represent portions of the same original frame 302; i.e. there was no subject motion between fields. Similarly, since field 304B is a repeat of field 304A, field jamming of fields 304B and 306 is also less likely to result in combing.

A clue to detecting a 3:2 pull-down cadence is to find repeated fields based on frame differences and their repetition period. Frame difference is defined as the difference between fields having a frame distance. For example, the frame difference between fields 304A and 304B will typically be smaller than other frame differences, such as that between 306 and 312, since field 304B is a repeat of field 304A. In 3:2 pulldown video, the smaller frame difference values typically occur at five field intervals. In one embodiment, the frame difference is calculated as the sum of pixel-by-pixel absolute differences between two fields having a frame distance. Frame difference is also referred to as motion, since the movement of various objects projected to successive frames results in differences between each frame.

Figure 4:
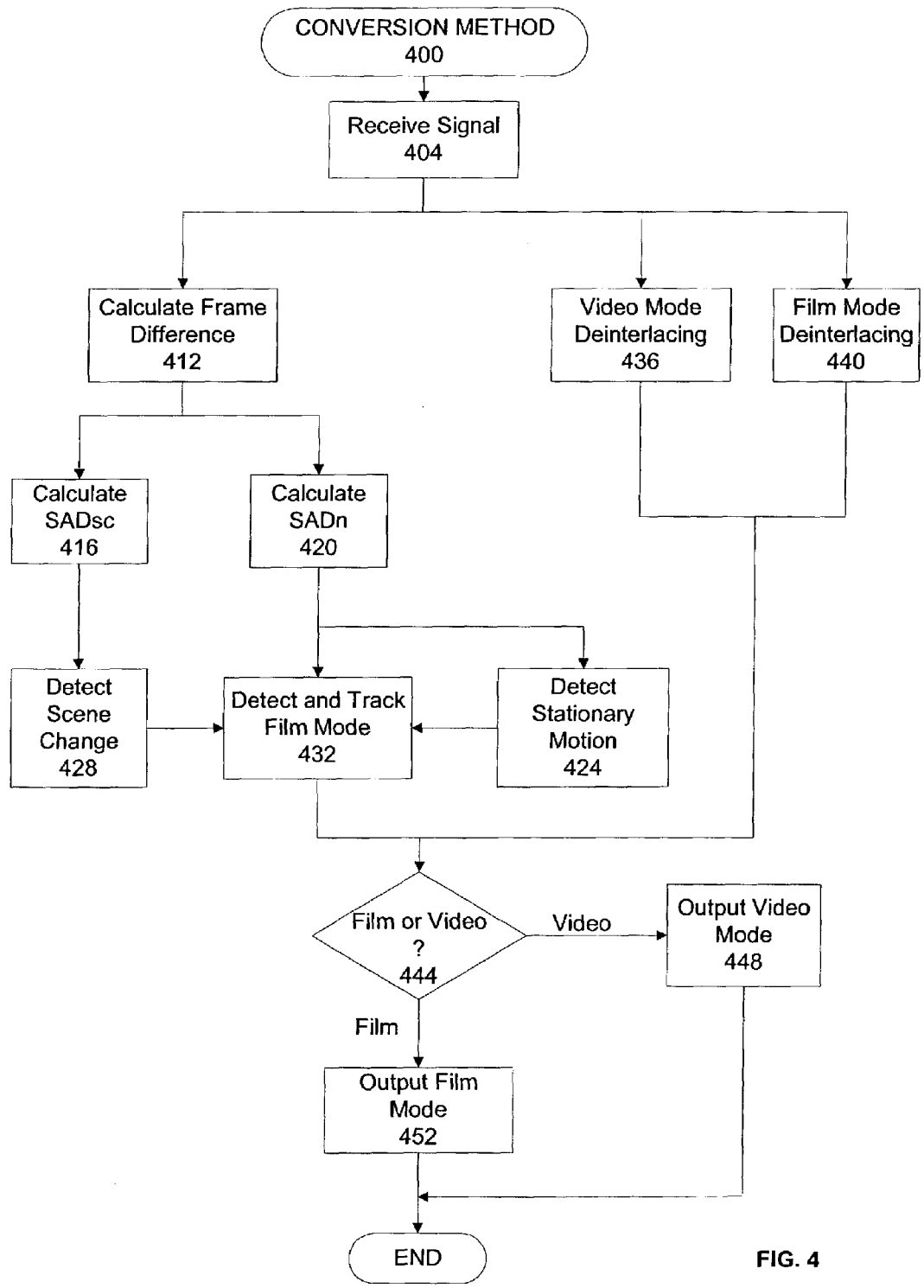
FIG. 4 illustrates a flow chart of an embodiment of converting an interlaced signal to a progressive signal.

FIG. 4 illustrates a flow chart of an embodiment of converting an interlaced signal to a progressive signal. In one embodiment, the present invention is implemented by a conversion method 400 which converts an interlaced signal to a progressive scan signal, and also detects a 3:2 pulldown cadence. At processing block 404, the method 400 receives an interlaced signal. At processing block 412, the method 400 calculates frame differences between corresponding pixels of fields having a frame distance. As noted above, in one embodiment, a pixel-by-pixel sum of absolute difference is used. At processing block 416, the method 400 calculates scene change sum-of-absolute difference (SAD) values. At processing block 420, the method 400 calculates stationary motion sum-of-absolute difference values. The operation of blocks 412, 416, and 420 is described in more detail below with respect to FIG. 7.

At processing block 424, the method 400 detects whether stationary motion is present. Stationary motion detection is described in more detail below with respect to FIGS. 10A and 10B. At processing block 428, the method 400 detects whether a scene change occurs. Scene change detection is described in more detail below with respect to FIGS. 9A and 9B. At processing block 432, the method 400 detects whether a film mode is present, and tracks a detected film mode. Film mode detection and tracking is described in more detail below with respect to FIG. 11.

At processing block 436, the method 400 converts the signal from interlaced scan to progressive scan using a video mode. In one embodiment, a motion-based algorithm is used to create progressive frames. At processing block 440, the method 400 converts the signal from interlaced scan to progressive scan using a film mode. In one embodiment, the film mode conversion uses a field jamming technique to create progressive frames. At decision block 444, the method 400 determines whether to convert the signal using the video mode or the film mode based on the output of processing block 432. If the signal is converted using the video mode, then at processing block 448, the video mode converted signal is output. If the method 400 decides to convert the signal using the film mode, then at processing block 452, the film mode converted signal is output.

In one embodiment, an interpolated frame includes pixels interpolated using the video mode interlaced-to-progressive conversion as well as pixels interpolated using the film mode interlaced-to-progressive conversion. For example, when a sub-picture/caption is inserted in video originating from a film source, film mode interlaced-to-progressive conversion may be used for the film source portion of the video, and video mode interlaced-to-progressive conversion may be used for the sub-picture/caption insertion.

Figure 5:
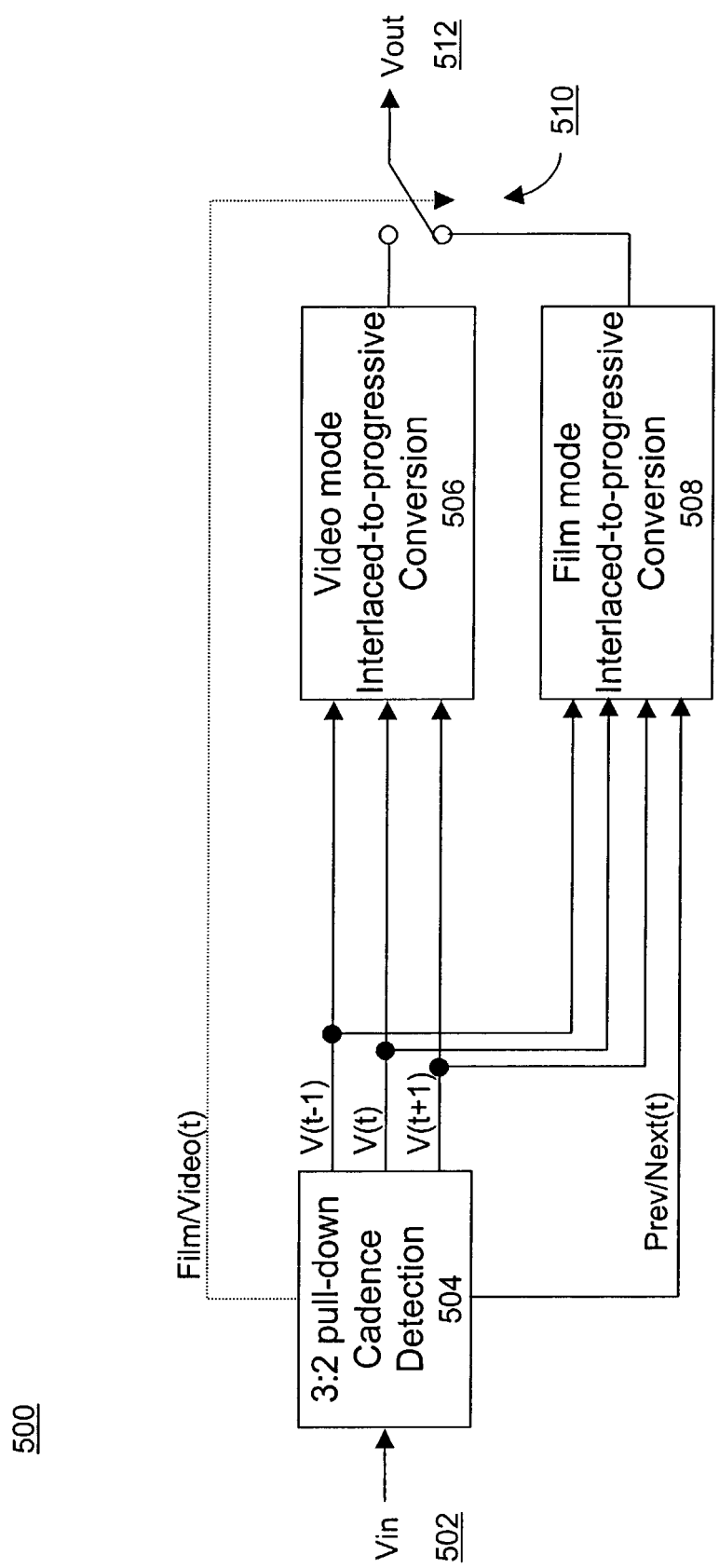
FIG. 5 shows a block diagram of an embodiment of an interlaced-to-progressive scan conversion system.

FIG. 5 shows a block diagram of an embodiment of an interlaced-to-progressive scan conversion system 500. In the embodiment shown in FIG. 5, missing field locations of the V(t) field are interpolated. An input signal Vin 502 is applied to a 3:2 pull-down cadence detection block 504 that includes various functions described below with respect to FIG. 6. The 3:2 pull-down cadence detection block 504 provides three fields denoted as V(t−1), V(t) and V(t+1) to a subsequent video mode interlaced-to-progressive conversion block 506 and a film mode interlaced-to-progressive conversion block 508. In one embodiment, all three fields are temporally consecutive and equally spaced by 1/60 second (accurately 1/59.94 second).

In one embodiment, the video mode interlaced-to-progressive conversion block 506 handles conversion of non-film source video. In one embodiment, video mode interlaced-to-progressive conversion block 506 uses a motion-based deinterlacing algorithm. Examples of motion-based algorithms are motion-adaptive or motion-compensated deinterlacing algorithms.

The film mode interlaced-to-progressive conversion block 508 selects between fields V(t−1) and V(t+1) based on the field jamming direction flag, Prev/Next(t), and outputs a field-jammed frame based on V(t) and the selected field. An output switch 510 provides interpolation results to Vout 512 based on the Film/Video(t) flag. The Film/Video(t) flag is sent from the 3:2 pull-down cadence detection block 504 to the switch 510 and indicates whether the missing field of V(t) should be interpolated using the film mode interlaced-to-progressive conversion or the video mode interlaced-to-progressive conversion.

In one embodiment, the 3:2 pull-down cadence detection block 504 has two global states, a "detection phase" and a "tracking phase". The detection phase denotes that the 3:2 pull-down cadence detection block 504 is searching and locking a 3:2 pull-down cadence from incoming video 502. During the detection phase, the 3:2 pull-down cadence detection block 504 selects an output of the video mode interlaced-to-progressive conversion block 506. The tracking phase denotes a 3:2 pull-down cadence has been acquired from the detection phase, and keeps track of the acquired 3:2 pull-down cadence to adapt to a possible cadence break. During tracking phase, the 3:2 pull-down cadence detection block 504 selects either the result of video mode interlaced-to-progressive conversion block 506 or the film mode interlaced-to-progressive conversion block 508 depending on the tracking result. In one embodiment, the film mode conversion is used until a cadence break is detected, indicating that the source is no longer film, at which point the system switches to a video mode conversion.

Figure 6:
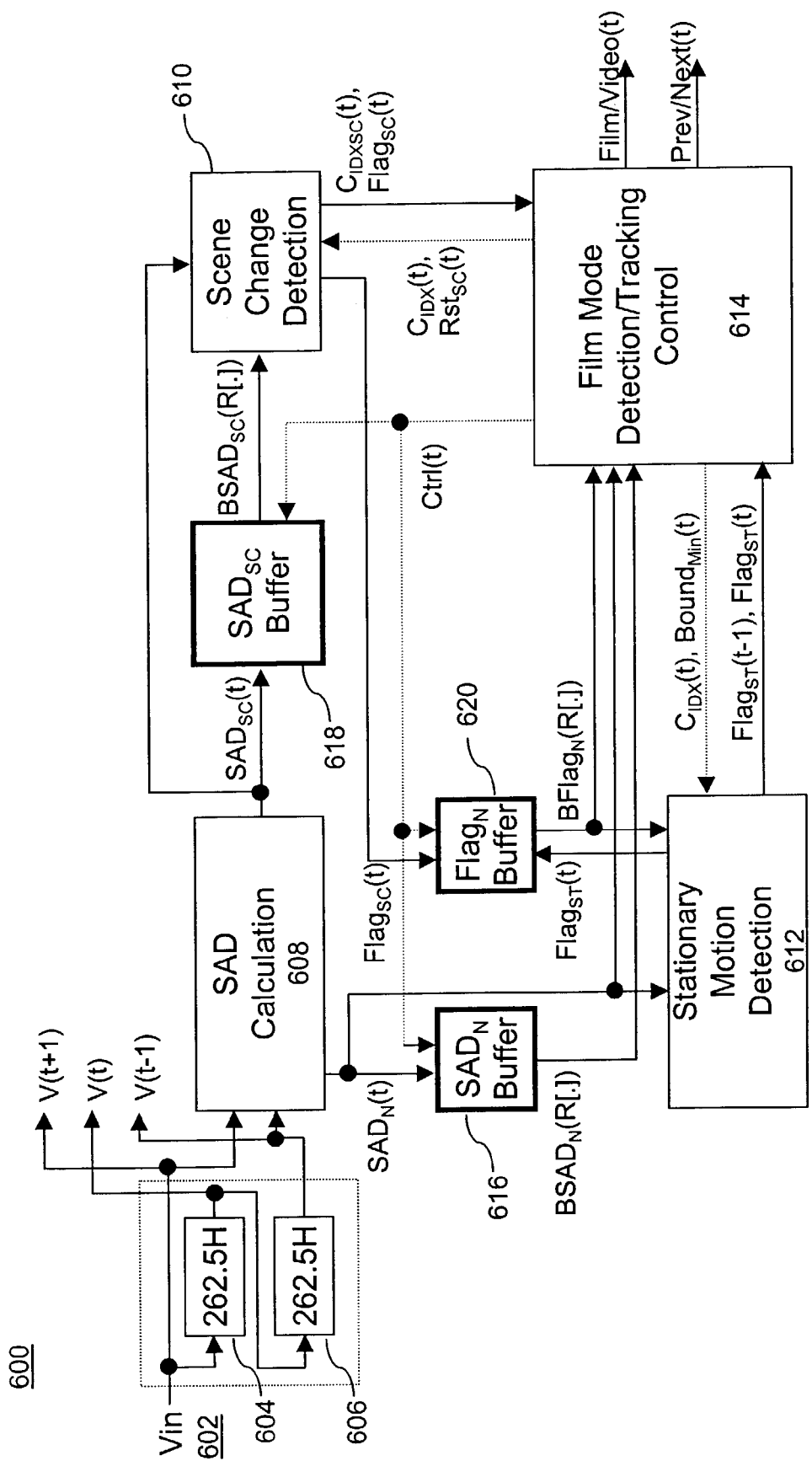
FIG. 6 shows a block diagram of an embodiment of the 3:2 pull-down cadence detection block.

FIG. 6 shows a block diagram of an embodiment of the 3:2 pull-down cadence detection block, as shown in FIG. 5. In the embodiment shown in FIG. 6, missing field locations of the V(t) field are interpolated. An interlaced video signal Vin 602 is applied to field memories 604 and 606 to provide time-delayed signals V(t) and V(t−1), respectively. The V(t+1) signal is Vin itself. The V(t) and V(t−1) signals are one and two field delayed versions of Vin, respectively. The SAD (sum-of-absolute-difference) calculation block 608 receives the V(t−1) signal from field memory 606. The SAD calculation block 608 also receives the V(t+1) signal. The SAD calculation block 608 extracts luminance components from the received signals and calculates two sum-of absolute difference (SAD) values, $SAD_{SC}(t)$ and $SAD_N(t)$. The $SAD_{SC}(t)$ value is sent to the scene change detection block 610 and the $SAD_N(t)$ value is sent to both the stationary motion detection block 612 and the film mode detection/tracking control block 614.

Two SAD buffers, $SAD_N$ Buffer 616 and $SAD_{SC}$ Buffer 618, receive SAD values from the SAD calculation block 608. It will be appreciated that the size of each SAD buffer 616, 618 may be varied. In one embodiment, for example, each SAD buffer 616, 618 holds twenty SAD values. During the detection phase, the two SAD buffers 616, 618 accumulate the twenty most recent SAD values. The $BSAD_{SC}(R[.])$ and $BSAD_N(R[.])$ values denote buffered SAD values corresponding to $SAD_{SC}(t)$ and $SAD_N(t)$, respectively, which are located in the R[.]-th location of the respective buffers 616, 618. The $SAD_N$ Buffer 616 and the $SAD_{SC}$ Buffer 618 supply actual SAD values to subsequent blocks so that source dependent thresholds may be created during the tracking phase.

In addition to SAD buffers 616, 618, in one embodiment there is also a $Flag_N$ Buffer 620. Each location of the $Flag_N$ Buffer 620 stores validity information for the value stored in the respective location in the $SAD_N$ Buffer 616. It will be appreciated that the size of the flag buffer 850 may be varied. In one embodiment, the $Flag_N$ Buffer 620 stores three types of validity flags for each SAD value: "keep", "exception"

and "ignore." The $Flag_N$ Buffer 620 stores a "keep" flag for a SAD value during detection phase when the corresponding location of the $SAD_N$ buffer 616 stores a new SAD value. The "keep" flag denotes that the corresponding data in the $SAD_N$ buffer 616 is useful for later processing. Thus, when the tracking phase initiates, all the locations in the $Flag_N$ Buffer 620 initially have "keep" flags. The "exception" and "ignore" flags denote the corresponding SAD value coincides with the scene change point or the stationary motion point, respectively. The flag values are changed to "keep", "exception" or "ignore" status depending on the Ctrl(t) signal of the film mode detection/tracking control block 614 and two flag signals, $Flag_{SC}(t)$ and $Flag_{ST}(t)$, coming from the scene change detection block 610 and the stationary motion detection block 612, respectively.

In one embodiment, except for the most recent five samples, the buffered SAD values may be flushed out from the buffers 616, 618 upon the initiation of each new detection procedure. During the tracking phase, all three buffers 616, 618, 620 keep the most recent twenty SAD values and supply buffered SAD values to the scene change detection block 610, stationary motion detection block 612 and the film mode detection/tracking control block 614. The Ctrl(t) signal is sent from the film mode detection/tracking control block 614, and controls the shift of values within buffers 616, 618, and 620.

In one embodiment, the scene change detection block 610 receives the $SAD_{SC}(t)$ value from the SAD calculation block 608 and reads plurality of buffered SAD values from the $SAD_{SC}$ buffer 618. The scene change detection block 610 also receives signals $C_{IDX}(t)$ (cadence index) and $Rst_{SC}(t)$ (reset signal) from the film mode detection/tracking control block 614. The scene change detection block 610 determines whether a scene change happens between V(t−1) and V(t+1). The scene change detection block 610 uses the $BSAD_{SC}$(R[.]) values to calculate average recent motion. In one embodiment, if the $SAD_{SC}(t)$ value is greater than average recent motion, the scene change detection block 610 determines that a scene change occurred between V(t−1) and V(t+1), and subsequently sets $Flag_{SC}(t)$ to '1' to indicate the occurrence of a scene change to the film mode detection/tracking control block 614, and latches $C_{IDX}(t)$ to $C_{IDXSC}(t)$ to keep the cadence index at the scene change point. $C_{IDX}(t)$ is also used to discard SAD values which show no motion, due to 3:2 pull-down cadence, during the calculation of the average recent motion. Finding a scene change is useful for handling possible film-to-video editing since most editing points result in discontinuity of the scene. The $Rst_{SC}(t)$ signal coming from the film mode detection/tracking block 614 clears $Flag_{SC}(t)$ after handling possible film-to-video editing.

The stationary motion detection block 612 compares $SAD_N(t)$ with a $Bound_{Min}(t)$ value to check whether current $SAD_N$ value is close to the no motion threshold. It also checks the continuity of no motion values based on previously calculated flag values and $C_{IDX}(t)$. In one embodiment, the stationary motion detection block 612 keeps track of the correct 3:2 pull-down cadence while there is no object motion in successive video sequences. Since a 3:2 cadence might be corrupted by noise, tracking of a 3:2 pull-down cadence is continued during stationary motion. During tracking, possible film-to-film editing is prepared for by employing stricter conditions. The $Bound_{Min}(t)$ denotes an upper level threshold for no motion, and is dynamically updated in the film mode detection/tracking control block 614 during the tracking phase. The stationary motion detection block 612 sets $Flag_{ST}(t)$ to one to indicate the presence of a stationary motion period to the film mode detection/tracking control block 614. The $Flag_{ST}(t-1)$ is a one field delayed version of $Flag_{ST}(t)$.

The film mode detection/tracking control block 614 detects, locks and tracks a 3:2 pull-down cadence from incoming video based on $SAD_N(t)$, $BSAD_N(R[.])$, $Bflag_N(R[.])$, $Flag_{SC}(t)$, $C_{IDXSC}(t)$, $Flag_{ST}(t)$ and $Flag_{ST}(t-1)$. In one embodiment, the film mode detection/tracking control block 614 is comprised of two independent state machines as described below with respect to FIG. 12; a main state machine for handling normal operation and an auxiliary state machine for handling a special case.

In one embodiment, the main state machine of the film mode detection/tracking control block 614 has two global states, a "main detection phase" and a "main tracking phase". In one embodiment, the "main detection phase" of the main state machine includes four sub-states: "detection state," "1st locking state," "2nd locking state," and "3rd locking state." In one embodiment, the "main tracking phase" of the main state machine comprises ten sub-states that are indicated by the cadence index, for example, $C_{IDX}(t)=0, 1, 2, \ldots, 9$. In the detection state, the SAD buffers gather five SAD values and a decision logic of the film mode detection/tracking control block 614 finds a position corresponding to a minimum SAD value based on the $BSAD_N$(R[.]) values. The main state machine changes its state from "detection state" to "1st locking state," "2nd locking state," and "3rd locking state" when the decision logic finds the minimum SAD value at the same location of each new $BSAD_N(R[.])$.

If the decision logic finds the minimum value at the same locations in the four data sets, the main state machine changes its global state from "main detection phase" to "main tracking phase" and the decision logic calculates a starting value of $C_{IDX}(t)$. Otherwise, the main state machine goes back to "detection state" while the decision logic issues a buffer flush signal through Ctrl(t). $C_{IDX}(t)$ increases by one each time a film-to-video transition point or a bad editing point occurs. A bad editing point may occur when an edit is made which disrupts the 3:2 pulldown cadence. Once a 3:2 pull-down cadence is detected, and locked, the main state machine remains in the "main tracking phase" until $C_{IDX}(t)$ reaches 9. In one embodiment, source dependent threshold values are calculated from the most recent twenty SAD values at the beginning of "main tracking phase", at re-entry points of the 3:2 pull-down tracking, or when $C_{IDX}(t)$ is 0, 4, 5 and 9. In one embodiment, the threshold values are compared with $SAD_N(t)$ values at every field interval to detect those cadence break points. In one embodiment, the film mode detection/tracking control block 614 handles 2:2 or 3:3 cadence glitches while staying in the "main tracking phase". This feature prevents deinterlacing mode from frequently changing across well-known film-to-film editing boundaries. By handling these well-known cadence glitches, the present invention adapts to a new 3:2 pull-down cadence seamlessly while shifting $C_{IDX}(t)$ at the well-known editing boundaries.

The auxiliary state machine has an "auxiliary detection phase" and an "auxiliary tracking phase". The auxiliary state machine is activated only while the main state machine is in the "main tracking phase" and the incoming film sequence has stationary motion. The auxiliary state machine facilitates adaptation to a new 3:2 pull-down cadence when a film-to-film editing point occurs during a stationary motion period. In one embodiment, the auxiliary state machine finds a minimum SAD value position using strict conditions and locks a detected 3:2 pull-down cadence eight times during a "auxiliary detection phase". Since a 3:2 pull-down cadence might be easily corrupted by noise, a reliable 3:2 pull-down cadence may be detected by locking a detected pattern multiple times. The auxiliary state machine enters the "auxiliary tracking phase" after successfully locking a 3:2 pull-down cadence. The auxiliary state machine compares a current 3:2 pull-down cadence of the main state machine with the newly detected cadence during a stationary motion period. If the cadences are different, the auxiliary state machine initiates a cadence index $C_{IDX}(t)$ adjustment in the main state machine.

SAD Calculation

Figure 7:
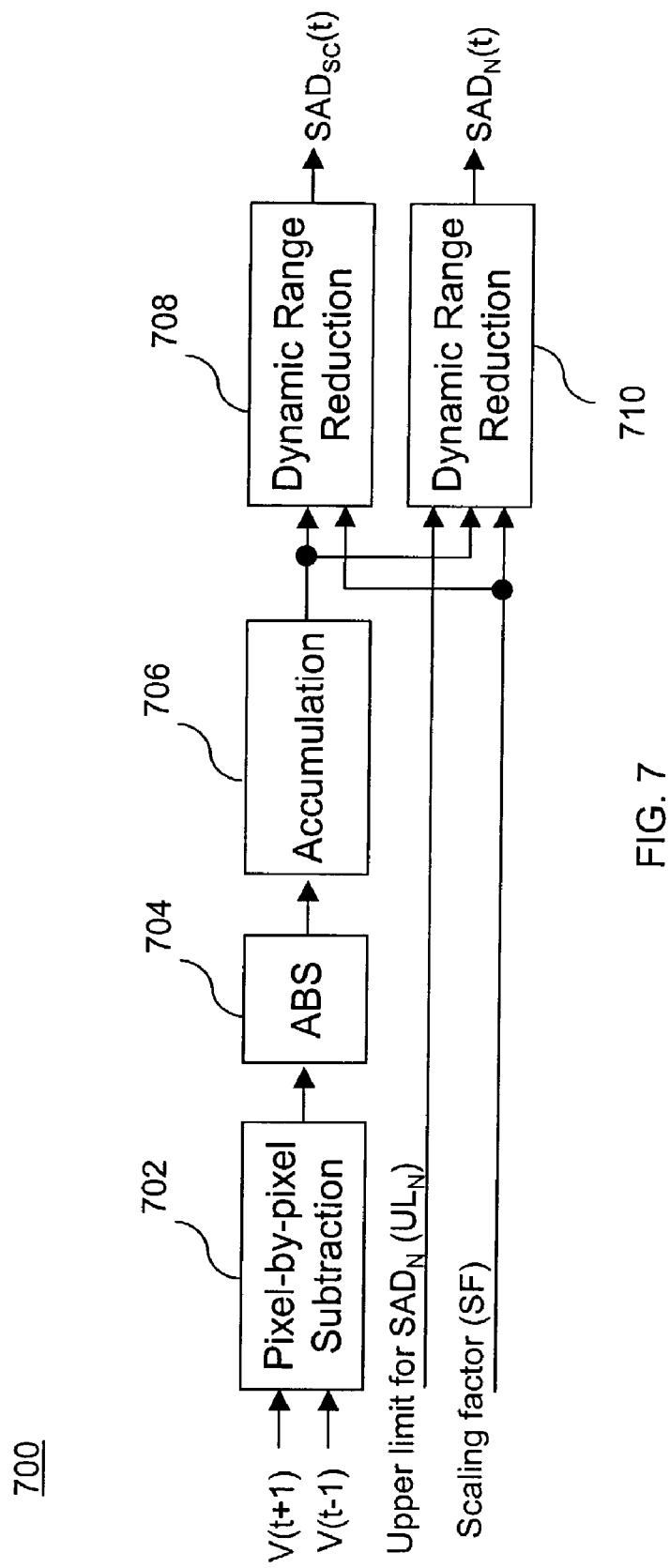
FIG. 7 shows a block diagram of one embodiment of the SAD calculation block.

Details of one embodiment of the SAD calculation block 608 of FIG. 6 are shown in FIG. 7. The SAD calculation block 700 calculates frame differences by subtracting luminance values of temporally adjacent pixels of V(t−1) and V(t+1). The frame difference gives a good measure for detecting repeated fields such as top fields 304A and 304B in FIG. 3. Pixel-by-pixel subtraction block 702 receives signals V(t+1) and V(t−1), and subtracts pixel values. Absolute value block 704 calculates the absolute value of the pixel-by-pixel subtraction results of block 702. An accumulation block 706 accumulates the results of the absolute values during one field time. As a result, the accumulation block 706 stores one measurement at the end of one field time. In one embodiment, the addition operation performed by accumulation block 706 is a type of low pass filtering operation, which reduces the effect of noise in the results.

In one embodiment, the SAD calculation block 700 calculates two types of SAD values, $SAD_{SC}(t)$ and $SAD_N(t)$, from the results of accumulation block 706. The $SAD_{SC}(t)$ is calculated by a dynamic range reduction block 708 using a scaling factor (SF). In one embodiment, the scaling factor is 80% or 0.80; e.g. applying a scaling factor of 0.8 to a value of 1 will yield a value of 0.8. It will be appreciated that the scaling factor may be fixed or variable. For example, in one embodiment, the scaling factor is variable based on the content of the video. $SAD_{SC}(t)$ is used for scene change detection.

The $SAD_N(t)$ is calculated by a dynamic range reduction block 710, which uses a scaling factor (SF), as well as an upper level limit ($UL_N$). In one embodiment, the $SAD_{SC}(t)$ and $SAD_N(t)$ calculations use the same scaling factor. $SAD_N(t)$ is used for stationary motion detection and film mode detection/tracking control. The upper level limit reduces the effect of sub-picture/caption insertion or abrupt motion on calculating various source dependent thresholds during the main tracking phase and the auxiliary tracking phase. In one embodiment, fixed upper level limits are used in the dynamic range reduction blocks 708, 710. In such an embodiment, the upper level limits are set to values much larger than typical noise levels.

SAD Buffer

An embodiment of a SAD buffer 800, such as $SAD_N$ buffer 616 and $SAD_{SC}$ Buffer 618 of FIG. 6, is shown in FIG. 8A. SAD Buffer 800, consists of twenty memory locations 802 with flexible shift logic. Specific memory locations 802 within buffer 800 are indicated as R0, R1, R2, etc. Initially, all memory locations 802 are cleared to zero. In one embodiment, during the "detection phase" of the main state machine, an SAD value 804 from the SAD calculation block is stored in a low memory location (i.e. R0) and managed as a unit of five samples. In one embodiment, the SAD buffer 800 gathers twenty SAD values 804 during the "detection phase" of the main state machine. For example, the $SAD_N$ buffer of the embodiment shown in FIG. 13 stores twenty $SAD_N(.)$ samples before t=24 as follows:

R[0]=d4, R[1]=d5, R[2]=d6, R[3]=d7, R[4]=d8,
R[5]=d9, R[6]=d10, R[7]=d11, R[8]=d12, R[9]=d13,
R[10]=d14, R[11]=d15, R[12]=d16, R[13]=d17, R[14]=d18,
R[15]=d19, R[16]=d20, R[17]=d21, R[18]=d22, R[19]=d23.

In one embodiment, when the film mode detection/tracking control block does not lock a 3:2 pull-down cadence, the buffered data, except for the last five received samples, are flushed out from the buffer 800, so as to start a new detection procedure. For example, referring to one embodiment shown in FIG. 13, the film mode detection/tracking control block investigates locking of a 3:2 pull-down cadence at time t=18. After receiving $SAD_N(18)$, the content of the $SAD_N$ buffer will be as follows:

R[0]=d4, R[1]=d5, R[2]=d6, R[3]=d7, R[4]=d8,
R[5]=d9, R[6]=d10, R[7]=d11, R[8]=d12, R[9]=d13,
R[10]=d14, R[11]=d15, R[12]=d16, R[13]=d17, R[14]=d18.

In one embodiment, if the film mode detection/tracking control block succeeds in locking a current 3:2 pull-down cadence and continues the current detection procedure, all SAD values are kept in the current memory locations and the newly arriving $SAD_N(19)$ value will be stored into the R[15] location. However, if the film mode detection/tracking control block fails to lock the current 3:2 pull-down cadence and starts new detection procedure, all of the SAD contents except for the most recent five samples will be flushed out from SAD buffer and the locations for the most recent five samples are changed as follows:

R[0]=d14, R[1]=d15, R[2]=d16, R[3]=d17, R[4]=d18.

The $SAD_N(19)$ will be stored in the R[5] location.

Figure 13:
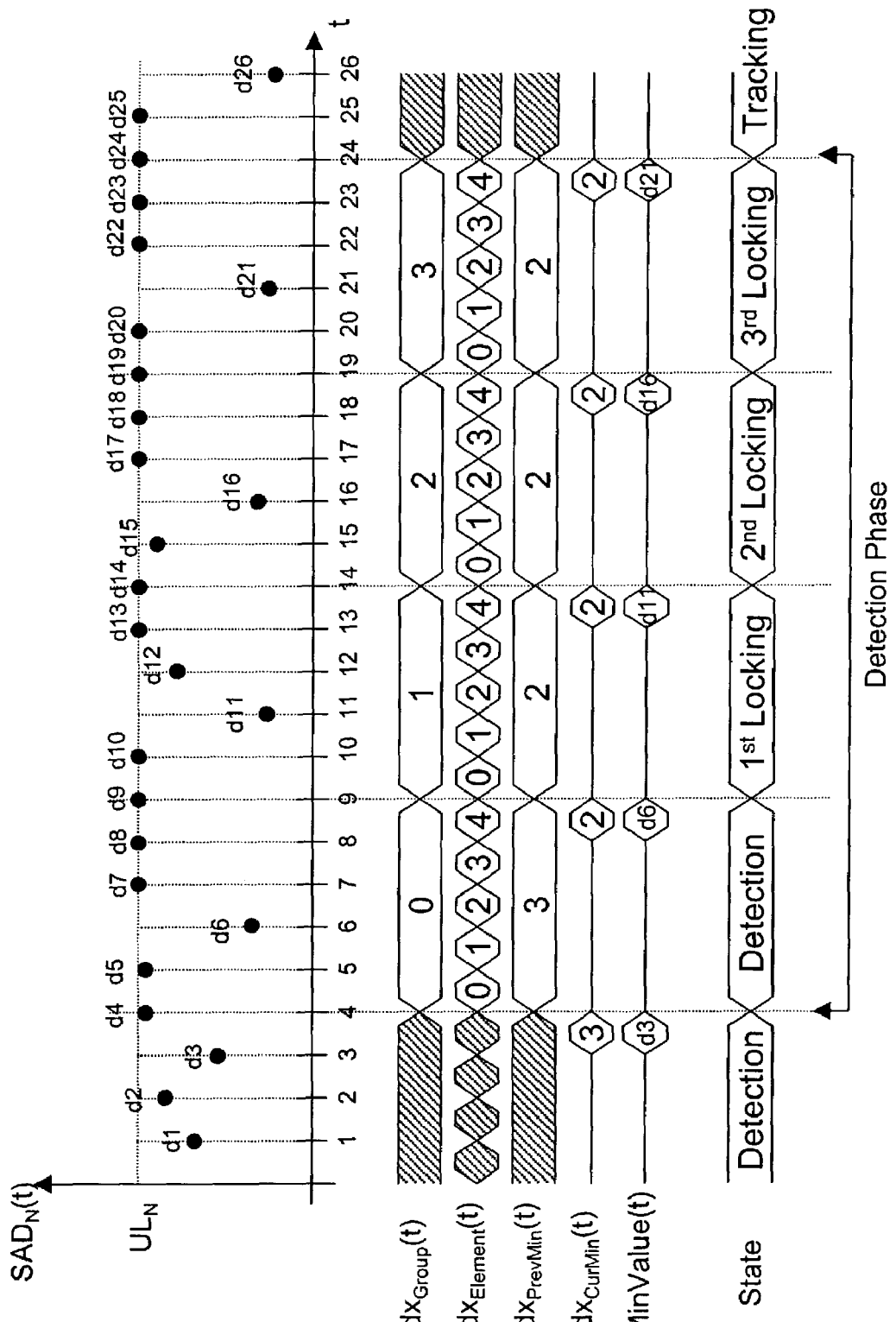
FIG. 13 shows an embodiment of the operation of the main state machine in the "detection phase."
Figure 14:
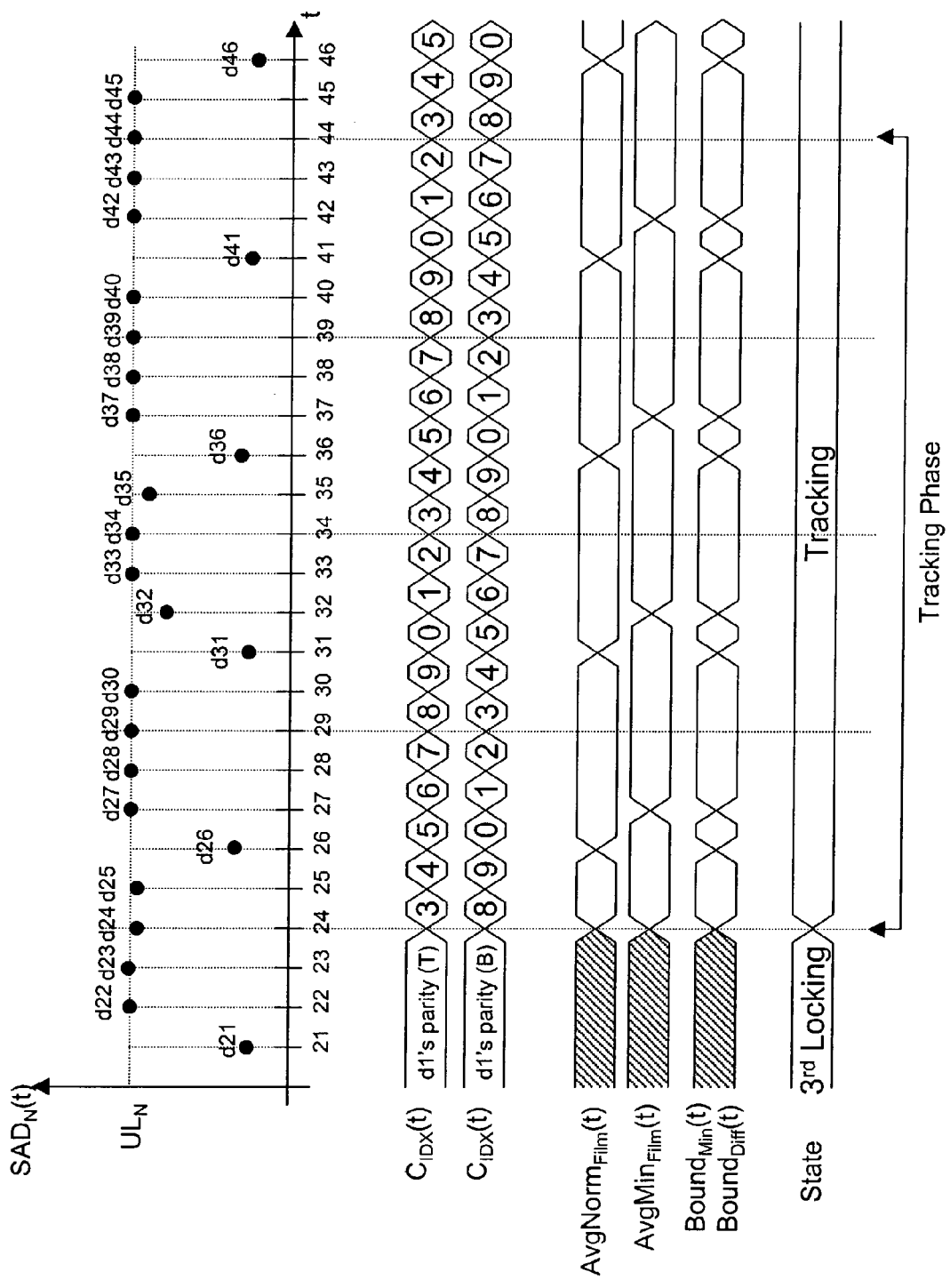
FIG. 14 shows an embodiment of the operation of the main state machine in the "tracking phase."

In one embodiment, during tracking phase, the location of each SAD value in the buffer 800 is managed sample-by-sample since the film mode detection/tracking control block evaluates the input and may change its state at every sample time. If there is no 3:2 pull-down cadence break due to source editing, the buffered SAD values are shifted to a lower memory location (e.g. from R[18] to R[17]) and a newly arriving SAD value is stored in the R[19] location. The contents of the $SAD_N$ buffer at time t=24 and 25 in the embodiments shown in FIG. 13 and FIG. 14 are as follows:

At time t=24,
R[0]=d5, R[1]=d6, R[2]=d7, R[3]=d8, R[4]=d9,
R[5]=d10, R[6]=d11, R[7]=d12, R[8]=d13, R[9]=d14,
R[10]=d15, R[11]=d16, R[12]=d17, R[13]=d18, R[14]=d19,
R[15]=d20, R[16]=d21, R[17]=d22, R[18]=d23, R[19]=d24.

At time t=25,
R[0]=d6, R[1]=d7, R[2]=d8, R[3]=d9, R[4]=d10,
R[5]=d11, R[6]=d12, R[7]=d13, R[8]=d14, R[9]=d15,
R[10]=d16, R[11]=d17, R[12]=d18, R[13]=d19, R[14]=d20,
R[15]=d21, R[16]=d22, R[17]=d23, R[18]=d24, R[19]=d25.

In one embodiment, the SAD buffer 800 stores the most recent twenty SAD values, from which various source-dependent thresholds are calculated. In addition, the value of $C_{IDX}(t)$ coincides with the location of the SAD value showing no motion. For example, the R[19] location stores a new SAD value showing no motion when $C_{IDX}(t)$ is 0 or 5. By doing this, SAD values showing no motion or motion may be retrieved while calculating source dependent threshold values. For example, when an average of no motion values at $C_{IDX}(t)=0$ or 5 is updated, recent no motion values may be retrieved by fetching SAD values from R[4+5i] locations, where i=0, 1, 2 and 3. It will be appreciated that the shift amount and direction of the SAD values may be varied. This random shift occurs during handling well-known film-to-film editing patterns. Since $C_{IDX}(t)$ is abruptly changed to adapt to a new 3:2 pull-down cadence, the SAD values are also shifted abruptly so as to maintain the correlation of the location of SAD values with the value of $C_{IDX}(t)$.

In one embodiment, the flag buffer 850 of FIG. 8B is managed in a similar manner as the SAD buffer 800 shown in FIG. 8A. The only difference is with respect to the values stored in the flag buffer 850. The value can be one of "keep", "exception" or "ignore" depending on the global state and results of scene change detection and stationary motion detection. Table 1 below illustrates the flag values:

TABLE 1

|  |  | Main state machine is in the "Detection phase" | Main state machine is in the "Tracking phase" |
|---|---|---|---|
| $Flag_{ST}(t)$ | On | Don't care | "Ignore" |
|  | Off | "Keep" | "Keep" |
| $Flag_{SC}(t)$ | On | Don't care | "Exception" |
|  | Off | "Keep" | "Keep" |

During the "tracking phase" of the main state machine, the film mode detection/tracking control block 614 normally uses SAD values flagged as "keep" for calculating source dependent threshold values. However, when stationary motion is detected, the auxiliary state machine uses the SAD values flagged as "Ignore" as well as "keep." The SAD values with "Ignore" state might be corrupted by noise, thus they are used only for additional information handling film-to-film editing point in the stationary motion period. The SAD values with flagged as "exception" occur at scene change points and have very large value due to motion discontinuity. In one embodiment, the film mode detection/tracking control block skips SAD values flagged as "exception" while calculating source dependent threshold values.

Scene Change Detection

Figure 9A:
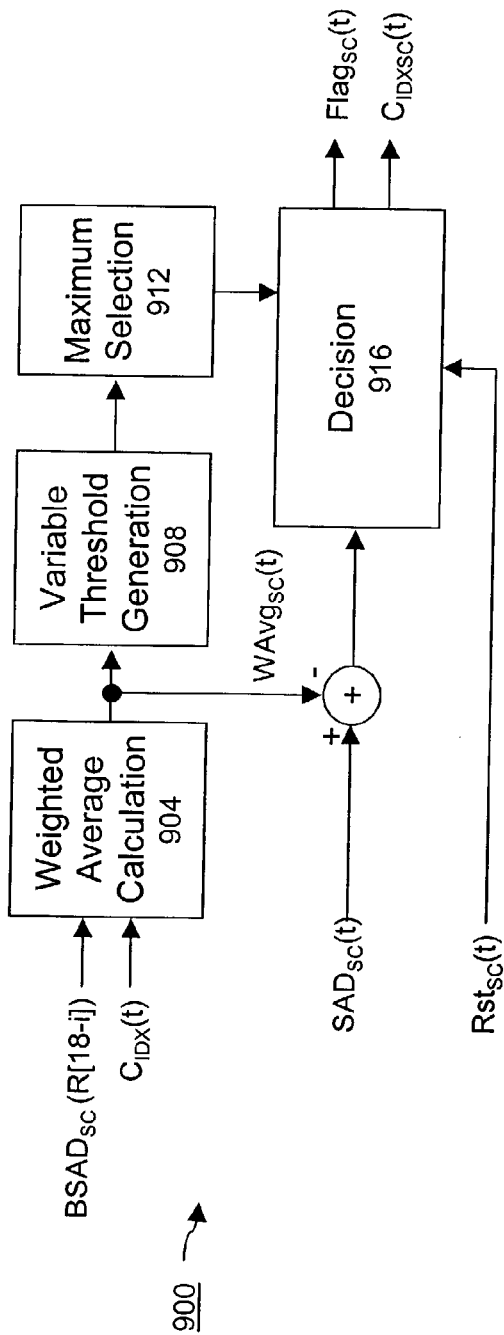
FIGS. 9A and 9B show embodiments of a scene change detection block.
Figure 9B:
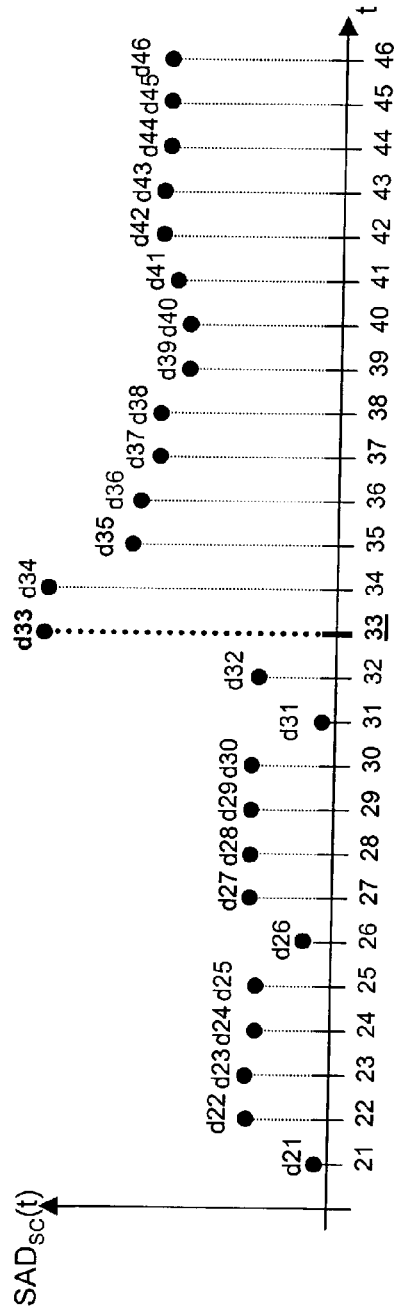

Details of one embodiment of the scene change detection block 610 of FIG. 6 are described with respect to FIGS. 9A and 9B. FIG. 9A shows an embodiment of the scene change detection block 610 shown in FIG. 6. Scene change detector 900 includes a weighted average calculator 904, a variable threshold generator 908, a maximum selector 912, and a scene change decision block 916.

The operation of the scene change detector 900 will be described with reference to FIG. 9B. As shown in FIG. 9B, a scene change occurs at t=33. The scene change detector 900 is active during the tracking phase, and thus the $C_{IDX}(t)$ is determined by the film mode detection/tracking control block so as to synchronize the location of no motion value in the $SAD_{SC}$ buffer. At time t=33, $SAD_{SC}(33)=d33$, $C_{IDX}(33)=2$ or 7 depending on the field parity of the d31 value, and previous data are stored in the $SAD_{SC}$ buffer as follows:

At time t=33,
R[0]=d14, R[1]=d15, R[2]=d16, R[3]=d17, R[4]=d18,
R[5]=d19, R[6]=d20, R[7]=d21, R[8]=d22, R[9]=d23,
R[10]=d24, R[11]=d25, R[12]=d26, R[13]=d27, R[14]=d28,
R[15]=d29, R[16]=d30, R[17]=d31, R[18]=d32, R[19]=x.

To detect a scene change, the weighted average calculator 904 calculates an average recent motion from buffered SAD data as follows:

If [(i is not 0) and (($C_{IDX}(t-i)\%5$) is not equal to 0)], $Wavg_{SC}(t) += W(i)*BSAD_{SC}(R[19-i])$.

$BSAD_{SC}(R[19-i])$ and W(i) denote the (i-th) SAD value read from R[19-i] location of the $SAD_{SC}$ buffer and its predefined weighting factor, respectively. It is noted that the weighting factor for the most recent SAD value usually has a larger value than others. Referring to FIG. 9B, $Wavg_{SC}(t)$, which represents the average motion of previous fields, can be determined based on the above equation:

$Wavg_{SC}(33)=W(1)*d32+W(3)*d30+W(4)*d29+W(5)*d28+W(6)*d27+W(8)*d25 \ldots +W(19)*d14$ Subsequently, the variable threshold generator 908 scales the weighted average based on a predefined scaling factor, ScF, and the maximum selector 912 selects a final threshold between $THL_{SC}$ and the scaled value. The $THL_{SC}$ denotes a low bound of the motion that can be detected as a scene change. The final threshold is determined as follows:

$Th=Max[ScF*Wavg_{SC}(t), THL_{SC}]$.

The decision block 916 compares the final threshold Th with a difference between $SAD_{SC}(t)$ and $Wavg_{SC}(t)$ to detect scene change. In the example shown in FIG. 9B, the value of $(d33-Wavg_{SC}(33))$ is compared with the threshold value and the decision block 916 detects a scene change since the difference is larger than the average motion. If a scene change is detected, the decision block 916 sets $Flag_{SC}(t)$ to one and latches $C_{IDX}(t)$ to $C_{IDXSC}(t)$ to indicate a scene change to the film mode detection/tracking control block. Detecting a scene change is useful for handling possible film-to-video editing, since most editing points have discontinuity of motion. The $Rst_{SC}(t)$ signal coming from the film mode detection/tracking control block clears the scene change flag after handling possible film-to-video editing.

Stationary Motion Detection

Figure 10A:
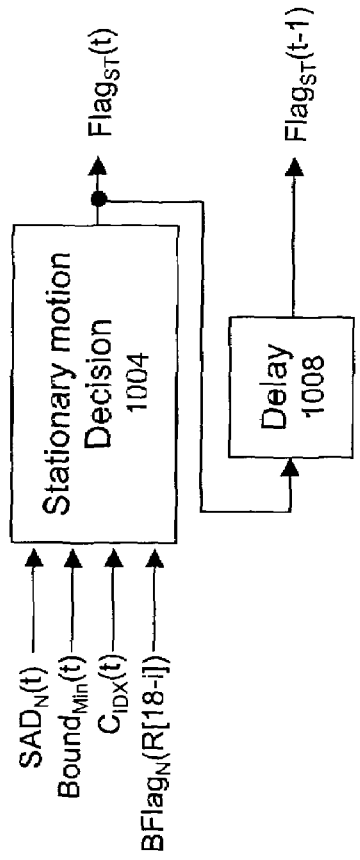
FIGS. 10A and 10B show embodiments of a stationary motion detection block.
Figure 10B:
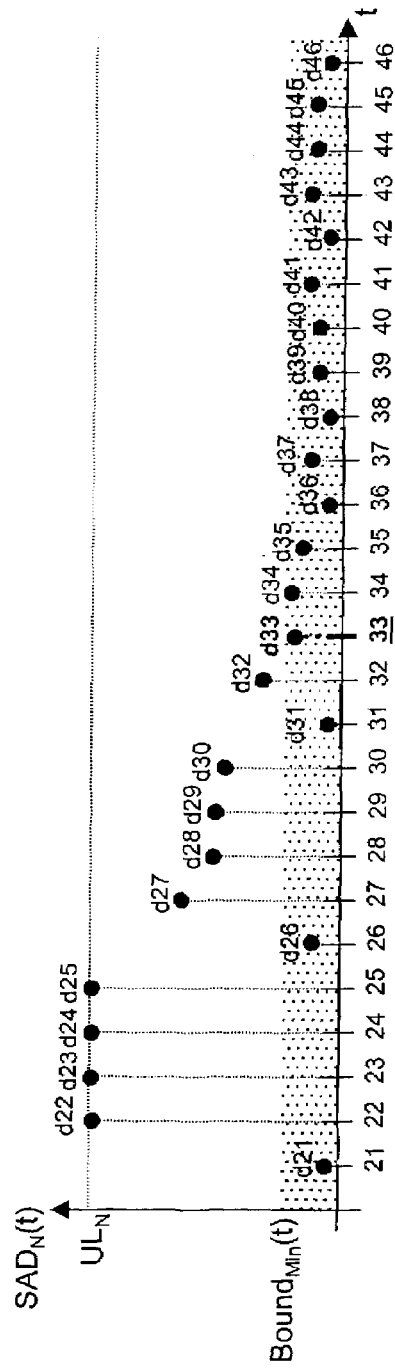

Details of an embodiment of the stationary motion detection block 612 of FIG. 6 are described with respect to FIGS. 10A and 10B. FIG. 10A shows an embodiment of a stationary motion detector 1000. The stationary motion detector 1000 is active in the tracking phase. The stationary motion detector 1000 checks the continuity of the stationary motion depending on the $C_{IDX}(t)$ value. The stationary motion decision block 1004 detects stationary motion as follows:

If ($SAD_N(t)$ is smaller than or equal to $Bound_{Min}(t)$)
If ((($C_{IDX}(t)\%5$) is 1) or
(($C_{IDX}(t)\%5$) is 2 and $BFlag_N(R[18])$ is "ignore") or
(($C_{IDX}(t)\%5$) is 3 and $BFlag_N(R[18])$ is "ignore" and $BFlag_N(R[17])$ is "ignore") or
(($C_{IDX}(t)\%5$) is 3 and $BFlag_N(R[18])$ is "ignore" and $BFlag_N(R[17])$ is "ignore" and $BFlag_N(R[17])$ is "ignore")) then
Stationary motion is detected. ($Flag_{ST}(t)=1$)

The $Bound_{Min}(t)$ is the upper bound of SAD value that can be considered no motion, and is determined dynamically in the film mode detection/tracking control block. The first if-condition of the above criterion is to check whether the current SAD value can be considered as no motion and the second if-condition is to check the continuity of stationary motion.

The delay block 1008 receives $Flag_{ST}(t)$ from the stationary motion decision block 1004, and delays $Flag_{ST}(t)$ to provide $Flag_{ST}(t-1)$.

In the embodiment shown in FIG. 10B, the stationary motion is detected at t=37 since the continuity condition is satisfied at time t=37. The following are the contents of the flag buffer at respective times:

At time t=33, $C_{IDX}(33)\%5=2$

R[0]="keep", R[1]="keep", R[2]="keep", R[3]="keep", R[4]="keep",

R[5]="keep", R[6]="keep", R[7]="keep", R[8]="keep", R[9]="keep",

R[10]="keep", R[11]="keep", R[12]="keep", R[13]="keep", R[14]="keep",

R[15]="keep", R[16]="keep", R[17]="keep", R[18]="keep", R[19]=x.

At time t=37, $C_{IDX}(33)\%5=1$

R[0]="keep", R[1]="keep", R[2]="keep", R[3]="keep", R[4]="keep",

R[5]="keep", R[6]="keep", R[7]="keep", R[8]="keep", R[9]="keep",

R[10]="keep", R[11]="keep", R[12]="keep", R[13]="keep", R[14]="keep",

R[15]="keep", R[16]="keep", R[17]="keep", R[18]="keep", R[19]=x.

At time t=38, $C_{IDX}(33)\%5=2$

R[0]="keep", R[1]="keep", R[2]="keep", R[3]="keep", R[4]="keep",

R[5]="keep", R[6]="keep", R[7]="keep", R[8]="keep", R[9]="keep",

R[10]="keep", R[11]="keep", R[12]="keep", R[13]="keep", R[14]="keep",

R[15]="keep", R[16]="keep", R[17]="keep", R[18]="Ignore", R[19]=x.

At time t=41, $C_{IDX}(33)\%5=0$

R[0]="keep", R[1]="keep", R[2]="keep", R[3]="keep", R[4]="keep",

R[5]="keep", R[6]="keep", R[7]="keep", R[8]="keep", R[9]="keep",

R[10]="keep", R[11]="keep", R[12]="keep", R[13]="keep", R[14]="keep",

R[15]="Ignore", R[16]="Ignore", R[17]="Ignore", R[18]="Ignore", R[19]=x.

The stationary motion detector prevents the film mode detection/tracking control block from changing its tracking state as a result of a short 3:2 pull-down cadence violation due to noise. In the example of FIG. 10B, the film mode detection/tracking control block can recognize that the cadence violation during t=37~41 was caused from noise by examining flag values from R[15] to R[18]. Thus, the film mode detection/tracking control block continues the current tracking sequence while triggering a new 3:2 pull-down cadence tracking using the auxiliary state machine.

Film Mode Detection/Tracking

Figure 11:
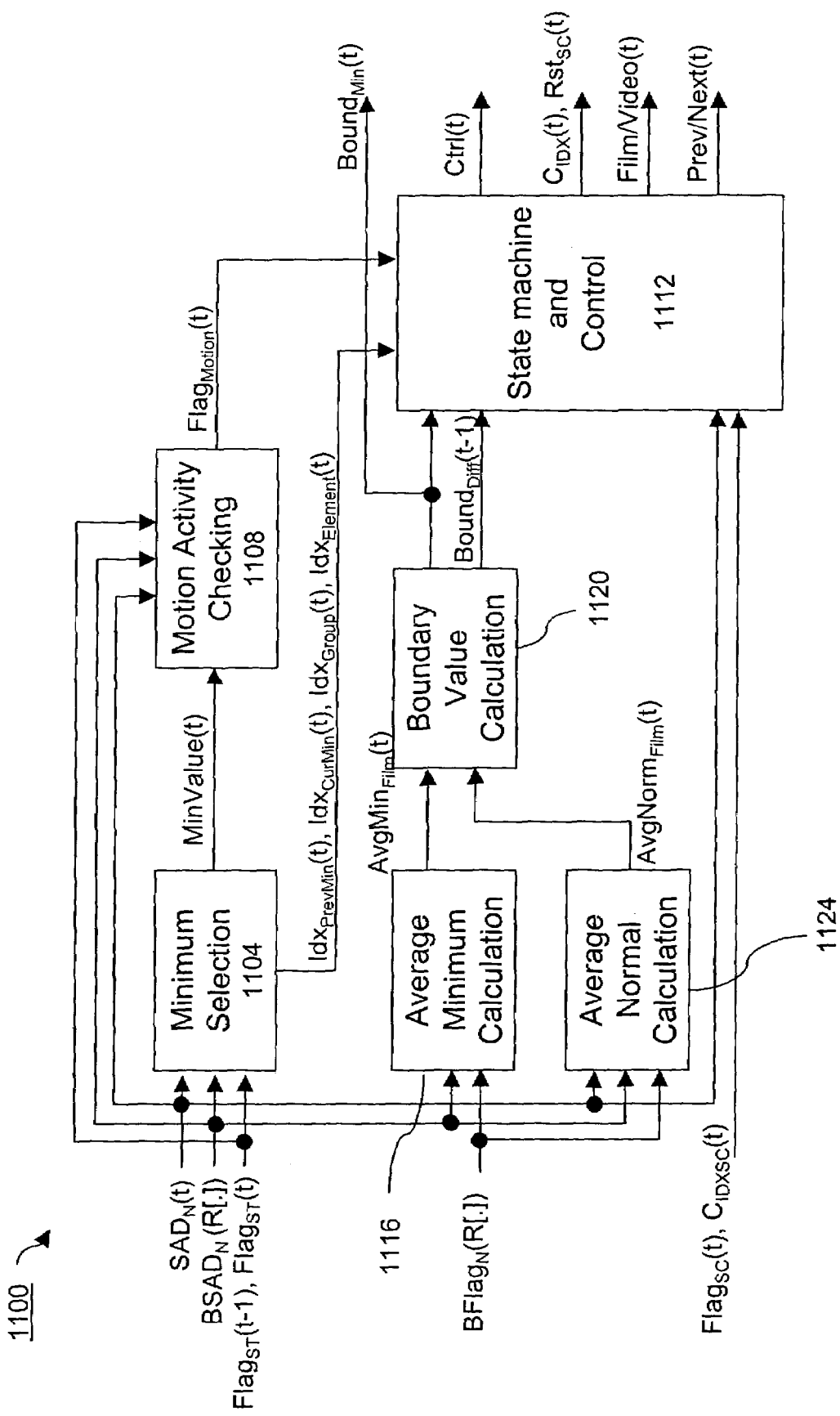
FIG. 11 illustrates a block diagram of an embodiment of the film mode detection/tracking block.

FIG. 11 illustrates a block diagram of an embodiment of the film mode detection/tracking block shown in FIG. 6. The film mode detection/tracking block 1100 includes a minimum selection block 1104, a motion activity checking block 1108, a state machine and control block 1112, an average minimum calculation block 1116, a boundary value calculation block 1120, and an average normal calculation block 1124.

Figure 12:
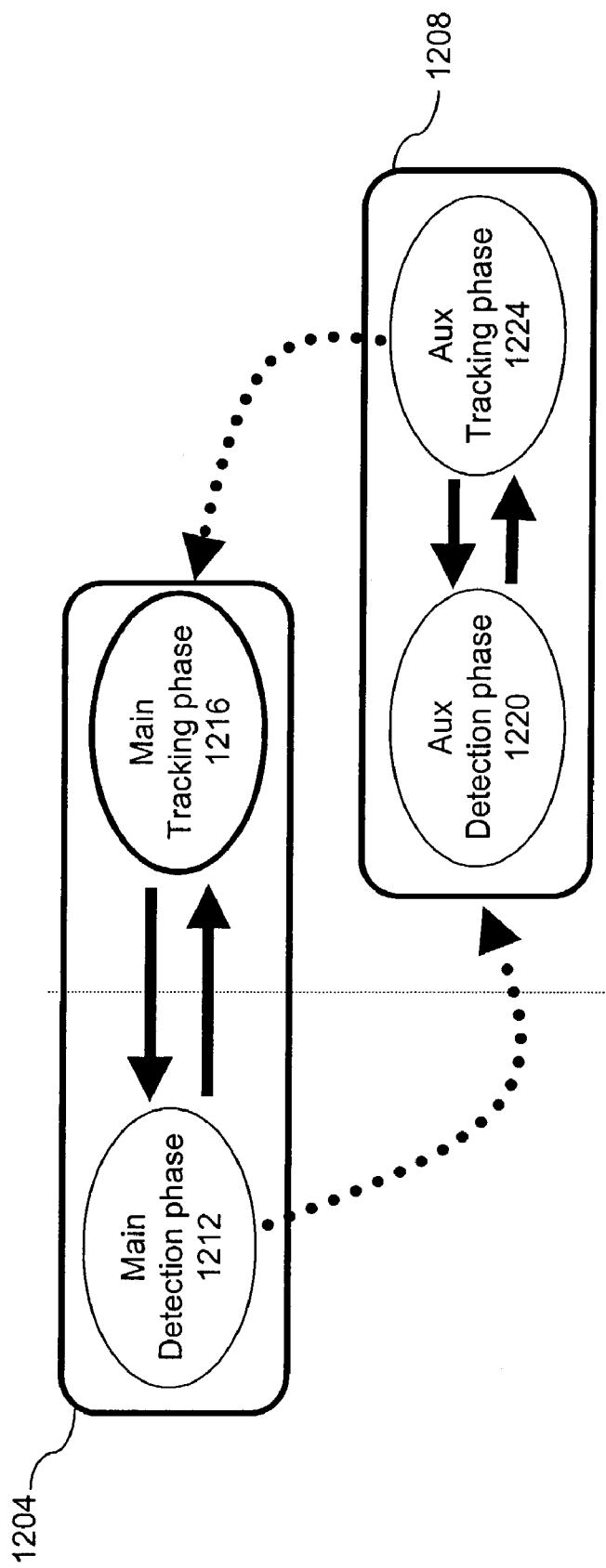
FIG. 12 shows an embodiment of a state machine.

In one embodiment, the state machine and control block 1112 internally has two independent state machines, shown in FIG. 12. A main state machine 1204 handles normal operation, and an auxiliary state machine 1208 handles cadence breaks during stationary motion.

The main state machine 1204 has two global states, a "main detection phase" 1212 and a "main tracking phase" 1216. The "main detection phase" 1212 of the main state machine 1204 consists of four sub-states; "detection state", "1st locking state", "2nd locking state" and "3rd locking state". The "main tracking phase" 1216 of the main state machine 1204 comprises ten sub-states which are indicated by the cadence index, for example, $C_{IDX}(t)=0, 1, 2, \ldots, 9$.

The auxiliary state machine 1208 also has two global states, an "auxiliary detection phase" 1220 and an "auxiliary tracking phase" 1224. The "auxiliary detection phase" 1220 consists of eight sub-states. The "auxiliary tracking phase" 1224 comprises ten sub-states which are indicated by cadence index such as $C_{IDXAUX}(t)=0, 1, 2, \ldots, 9$.

FIG. 13 and FIG. 14 show embodiments which will facilitate explanation of the system shown in FIG. 11. The state machines 1204, 1208 find and lock a 3:2 pull-down cadence during their respective "detection phases" 1212, 1220 and keep track of the locked 3:2 pull-down cadence to control deinterlacing mode and jamming direction during their respective "tracking phases" 1216, 1224.

As shown in FIG. 13, the main state machine 1204 is in the "detection state" of the "main detection phase" 1212 at time t=4. Typical 3:2 pull-down cadence has one minimum SAD value every five samples. The main state machine 1204 examines the SAD values for this pattern during "main detection phase". Initially, the SAD buffer is cleared and two index values, $Idx_{Group}(t)$ and $Idx_{Element}(t)$, of the minimum selection block 1104 are also set to zero. $Idx_{Group}(t)$ and $Idx_{Element}(t)$ denote a group index and an element index in a group, respectively. The SAD values coming from the SAD calculation block are stored in the SAD buffer until the $Idx_{Element}(t)=4$, which indicates the arrival of the last SAD value belonging to the current group. At time t=8, the $Idx_{Element}(t)$ becomes 4 and the SAD values are located in the SAD buffer as follows:

R[0]=d4, R[1]=d5, R[2]=d6, R[3]=d7, R[4]=d8,

R[5]=0, R[6]=0, R[7]=0, R[8]=0, R[9]=0,

R[10]=0, R[1]=0, R[12]=0, R[13]=0, R[14]=0,

R[15]=0, R[16]=0, R[17]=0, R[18]=0, R[19]=0.

Once a complete set of SAD values are stored in the SAD buffer, the minimum selection block 1104 reads those SAD values, finds a minimum element index corresponding to the minimum value, MinValue(t), and stores the index to the $Idx_{CurMin}(t)$. FIG. 13 shows the stored index value is 2 at time t=8. After finding the minimum element index for the first set, the main state machine 1204 changes its sub-state from "detection state" to "1st locking state".

During "1st locking state", the next five SAD values are stored in the SAD buffer while the minimum element index is moved to $Idx_{PrevMin}(t)$. At time t=13, the SAD values are located in the buffers as follows:

R[0]=d4, R[1]=d5, R[2]=d6, R[3]=d7, R[4]=d8,

R[5]=d9, R[6]=d10, R[7]=d11, R[8]=d12, R[9]=d13,

R[10]=0, R[11]=0, R[12]=0, R[13]=0, R[14]=0,

R[15]=0, R[16]=0, R[17]=0, R[18]=0, R[19]=0.

The minimum selection block 1104 reads the second set of SAD values from the SAD buffer and finds the minimum element index for the second set and stores it to the $Idx_{CurMin}(t)$. In the example shown in FIG. 13, the MinValue(t) and $Idx_{CurMin}(t)$ for the second set are d11 and 2, respectively.

Referring again to FIG. 11, the motion activity checking block 1108 checks whether the MinValue(t) is reliable or not. The motion activity checking block 1108 reads each SAD value and compares it with MinValue(t). If a difference between one SAD value and MinValue(t) is smaller than a threshold value, the motion activity checking block 1108 increments its internal count. The count should be one to guarantee there is one unique SAD value corresponding to no motion in the second set. If the count value is one, then the motion activity checking block 1108 sets $Flag_{Motion}(t)$ to one. In the example shown in FIG. 13, the $Flag_{Motion}(t)$ is calculated as follows:

$Flag_{Motion}(13)=0$; Count=0;
From i=5 to i=9
If ((R[i]−MinValue(13)) is smaller than a predefined threshold)
  Count++
If (Count is equal to 1) then
  $Flag_{Motion}(13)=1$.

The main state machine 1204 changes its sub-state from "1st locking state" to "2nd locking state" if the following conditions are satisfied, and repeats this procedure for the next set:

Condition1: $Idx_{CurMin}(t)$ is equal to $Idx_{PrevMin}(t)$.
Condition2: $Flag_{Motion}(t)$ is set to one.

Since $Idx_{CurMin}(t)$ and $Idx_{PrevMin}(t)$ have values within the range of 0 to 4, the first condition shows whether the period of SAD values corresponding to no motion is five and the second condition checks the reliability of the SAD value corresponding to no motion.

In a situation where either Condition1 or Condition2 is not satisfied, the main state machine 1204 goes back to "detection state", and the SAD buffers are initialized as follows to detect a newly started possible film source:

R[0]=d9, R[1]=d10, R[2]=d11, R[3]=d12, R[4]=d13,
R[5]=0, R[6]=0, R[7]=0, R[8]=0, R[9]=0,
R[10]=0, R[11]=0, R[12]=0, R[13]=0, R[14]=0,
R[15]=0, R[16]=0, R[17]=0, R[18]=0, R[19]=0.

During "2nd and 3rd locking states", the main state machine 1204 checks the above two conditions repeatedly. In a situation where both conditions are satisfied continuously, the SAD values are stored in the buffers as follows:

R[0]=d4, R[1]=d5, R[2]=d6, R[3]=d7, R[4]=d8,
R[5]=d9, R[6]=d10, R[7]=d11, R[8]=d12, R[9]=d13,
R[10]=d14, R[11]=d15, R[12]=d16, R[13]=d17, R[14]=d18,
R[15]=d19, R[16]=d20, R[17]=d21, R[18]=d22, R[19]=d23.

It is noted that the two conditions being checked during the main detection phase are not dependent on the noise level of the incoming video. During the "main detection phase", the state machine/control block 1100 sets Film/Video(t) to zero to select the output of the video mode interlaced-to-progressive conversion block.

In one embodiment, when a 3:2 pull-down cadence from the incoming video is detected and locked, the main state machine 1204 changes its state from "main detection phase" 1212 ("3rd locking state") to "main tracking phase" 1216. The state machine/control block 1112 treats incoming video as the film sequence during the "main tracking phase" and sets the Film/Video(t) to one to select the output of the film mode interlaced-to-progressive conversion block, unless a 3:2 pull-down cadence break is detected.

FIG. 14 shows the start of the "main tracking phase" at t=24. Since the present invention checks for a cadence break at every field time during the "main tracking phase", several thresholds and variables are initialized before normal tracking operations are initiated. The thresholds and variables include $C_{IDX}(t)$, $AvgNorm_{Film}(t)$, $AvgMin_{Film}(t)$, $Bound_{Diff}(t)$ and $Bound_{Min}(t)$.

The $C_{IDX}(t)$ has a value ranging from 0 to 9, and each index value specifies a set of available input fields, a condition of $SAD_N(t)$ corresponding to each index, and a field jamming direction for the film mode deinterlacing. Table 2 shows a summary of input conditions and control information specified by the cadence index:

TABLE 2

| $C_{IDX}(t)$ | A set of available input fields, V(t − 1):V(t):V(T + 1) | Interpolated field, V(t) | A condition of $SAD_N(t)$ value in the film source | Jamming field and direction |
|---|---|---|---|---|
| 0 | T1:B1:T1 | B1 | No motion | T1 (Forward) |
| 1 | B1:T1:B2 | T1 | Motion | B1 (Forward) |
| 2 | T1:B2:T2 | B2 | Motion | T2 (Backward) |
| 3 | B2:T2:B3 | T2 | Motion | B2 (Forward) |
| 4 | T2:B3:T3 | B3 | Motion | T3 (Backward) |
| 5 | B3:T3:B3 | T3 | No motion | B3 (Forward) |
| 6 | T3:B3:T4 | B3 | Motion | T3 (Forward) |
| 7 | B3:T4:B4 | T4 | Motion | B4 (Backward) |
| 8 | T4:B4:T1' | B4 | Motion | T4 (Forward) |
| 9 | B4:T1':B1' | T1' | Motion | B1' (Backward) |

Initially, the $C_{IDX}(t)$ is determined based on the sample distance of the current SAD value from the minimum SAD value at a phase transition time. In the embodiments shown in FIG. 13 and FIG. 14, the previous minimum SAD value is d21. Depending on the field parity of V(t) field at time t=21, $C_{IDX}(21)$ corresponding to d21 is 0 or 5, based on the above Table 2. Since a typical 3:2 pull-down sequence has the field repetition pattern as shown in FIG. 3, the set of input fields at time t=24 is either B2-T2-B3 or T4-B4-T1', and the cadence index at time t=24 is 3 or 8. The following equation is used for determining the initial value of $C_{IDX}(t)$:

$C_{IDX}(24)=$ $((5-Idx_{CurMin}(23))+((\text{Parity of MinValue}(23)==\text{"Top field"}) ?0: 5)) \% 10.$ During normal "main tracking phase", the $C_{IDX}(t)$ is incremented and repeated as long as the field repetition of FIG. 3 is continued. Thus, the state machine/control block 1112 can generate control signals based on the $C_{IDX}(t)$. In addition, the state machine/control block 1112 can classify SAD values in the SAD buffer for calculating source dependent thresholds since the $C_{IDX}(t)$ can be used as a pointer for specific buffer locations.

$AvgNorm_{Film}(t)$, $AvgMin_{Film}(t)$, $Bound_{Diff}(t)$ and $Bound_{Min}(t)$ values are source dependent threshold values that are compared with $SAD_N(t)$ to check whether a break occurs in the 3:2 pull-down cadence. The $AvgNorm_{Film}(t)$ is the average motion value which is calculated in the average normal calculation block 1124. The following equation is used to calculate AvgNormFilm(t):

At the beginning of "main tracking phase"
From (i=i0=15+$C_{IDX}(t)$) to (i=19)

$AvgNorm_{Film}(t)+=W(i-i0)*BSAD_N(R[i])$

At $C_{IDX}(t)=4$ or 9 during "main tracking phase"
From (i=i0=15) to (i=19)
  If ($BFlag_N(R[i])$ is not equal to "exception")

$AvgNorm_{Film}(t)+=W(i-i0)*BSAD_N(R[i])$

W(i) is a weight value to find an average of SAD values.

The AvgNorm$_{Film}$(t) denotes average recent motion based on the SAD$_N$(t). In the example of FIG. 14, the AvgNorm$_{Film}$(t) is initialized at time t=24 and updated when the C$_{IDX}$(t) is 4 or 9, as follows:

At time t=24, $$\text{AvgNorm}_{Film}(24)=W(0)*d22+W(1)*d23$$

At time t=25, 30, 35, 40 and 45

$$\text{AvgNorm}_{Film}(25)=W(0)*d22+W(1)*d23+W(2)*d24+W(3)*d25,$$

$$\text{AvgNorm}_{Film}(30)=W(0)*d27+W(1)*d28+W(2)*d29+W(3)*d30,$$

$$\text{AvgNorm}_{Film}(35)=W(0)*d32+W(1)*d33+W(2)*d34+W(3)*d35,$$

$$\text{AvgNorm}_{Film}(40)=W(0)*d37+W(1)*d38+W(2)*d39+W(3)*d40,$$

$$\text{AvgNorm}_{Film}(45)=W(0)*d42+W(1)*d43+W(2)*d44+W(3)*d45.$$

The AvgMin$_{Film}$(t) is calculated in the average minimum calculation block 1116 by using four buffered SAD values showing no motion. The AvgMin$_{Film}$(t) denotes the average noise level measured from the incoming video. In one embodiment, at time t=24, the AvgMin$_{Film}$(t) is initialized and updated when C$_{IDX}$(t) is 0 or 5. Since the period of SAD values showing no motion is always 5 for a 3:2 cadence, the AvgMin$_{Film}$(t) is calculated with following equation:

At the beginning of "main tracking phase"
From (i=0) to (i=3)

$$\text{AvgMin}_{Film}(t)+=(\tfrac{1}{4})*\text{BSAD}_N(R[i*4+C_{IDX}(t)]),$$

At C$_{IDX}$(t)=0 or 5 during "main tracking phase"
From (i=0) to (i=3)

$$\text{AvgMin}_{Film}(t)+=(\tfrac{1}{4})*\text{BSAD}_N(R[i*4+4]).$$

In the embodiments shown in FIG. 13 and FIG. 14, the AvgMin$_{Film}$(t) at time t=24, 26, 31, 36 an 41 are calculated as follows:

$$\text{AvgMin}_{Film}(24)=(\tfrac{1}{4})*d6+(\tfrac{1}{4})*d11+(\tfrac{1}{4})*d16+(\tfrac{1}{4})*d21,$$

$$\text{AvgMin}_{Film}(26)=(\tfrac{1}{4})*d11+(\tfrac{1}{4})*d16+(\tfrac{1}{4})*d21+(\tfrac{1}{4})*d26,$$

$$\text{AvgMin}_{Film}(31)=(\tfrac{1}{4})*d16+(\tfrac{1}{4})*d21+(\tfrac{1}{4})*d26+(\tfrac{1}{4})*d31,$$

$$\text{AvgMin}_{Film}(36)=(\tfrac{1}{4})*d21+(\tfrac{1}{4})*d26+(\tfrac{1}{4})*d31+(\tfrac{1}{4})*d36,$$

$$\text{AvgMin}_{Film}(41)=(\tfrac{1}{4})*d26+(\tfrac{1}{4})*d31+(\tfrac{1}{4})*d36+(\tfrac{1}{4})*d41.$$

The Bound$_{Diff}$(t) and Bound$_{Min}$(t) are determined from AvgNorm$_{Film}$(t) and AvgMin$_{Film}$(t), when AvgNorm$_{Film}$(t) and AvgMin$_{Film}$(t) are updated, as shown by the following equations:

$$\text{Bound}_{Diff}(t)=SF*\text{abs}(\text{AvgNorm}_{Film}(t)-\text{AvgMin}_{Film}(t))$$

$$\text{Bound}_{Min}(t)=\text{AvgMin}_{Film}(t)+\text{Max}[LL_{Min}, \text{Min}[UL_{Min}, \text{Bound}_{Diff}(t)]]$$

SF is a scaling factor, LL$_{Min}$ is a low clamping bound, and UL$_{Min}$ is an upper clamping bound, respectively. The value of Bound$_{Min}$(t) changes depending on the difference of the "no motion" and "average motion" values. By comparing the value of Bound$_{Min}$(t) with SAD$_N$(t), it is possible to adaptively determine either "no motion" or "motion" for the SAD value.

Figure 15:
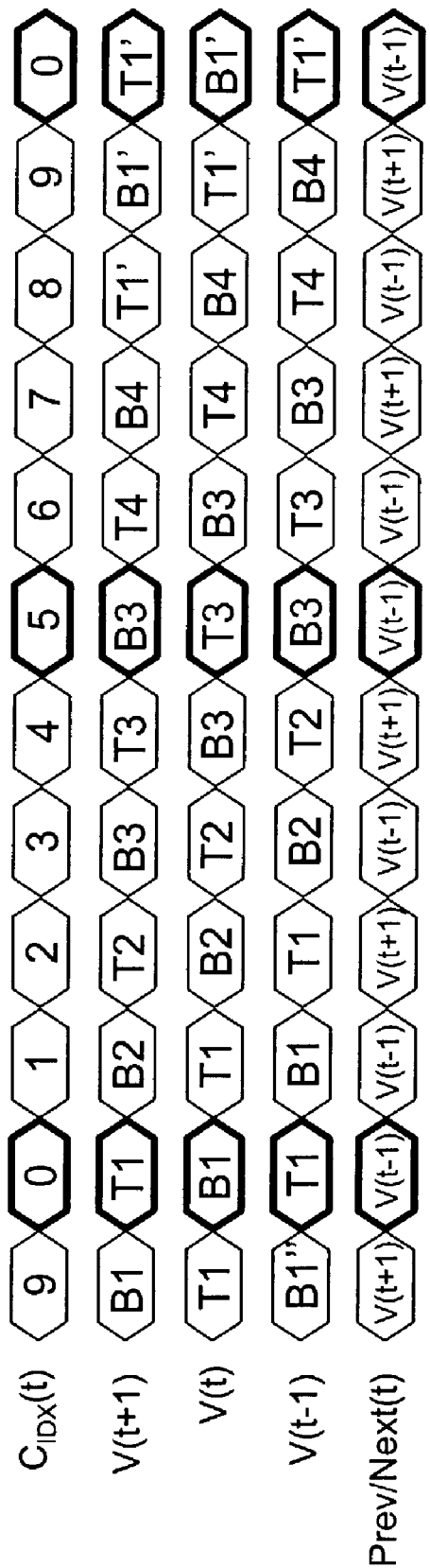
FIG. 15 shows embodiments of the cadence index transition, the input fields and the jamming field selection during the normal "main tracking phase."

FIG. 15 shows embodiments of the cadence index transition, the set of input fields and the jamming field selection of the film mode deinterlacing during the normal "main tracking phase". The sequence of FIG. 15 will be continued unless an editing point occurs, and the state machine/control block will select the output of the film mode interlaced-to-progressive conversion block while changing field jamming direction.

Management of 3:2 Pull-Down Cadence Breaks

In one embodiment, during normal "main tracking phase", the main state machine checks for an editing point at each C$_{IDX}$(t) transition and controls the selection of deinterlacing mode and state transition depending on the evaluation results. Table 3 shows embodiments of internal flags which are evaluated in the main state machine:

TABLE 3

| | |
|---|---|
| NoMotion/Motion | If SAD$_N$(t) is less than or equal to Bound$_{Min}$(t) and SAD$_N$(t) is a minimum in the most recent 5 SAD values including current one, this flag is set to "NoMotion". Unless an editing point happens, this flag should be set to "NoMotion" only at C$_{IDX}$(t) = 0 or 5. Once an editing point occurs, this flag may have "NoMotion" at any C$_{IDX}$(t) index. Thus, the main state machine re-synchronizes C$_{IDX}$(t) with this flag so that "NoMotion" values of the new film sequence happens at C$_{IDX}$(t) = 0 or 5. |
| SceneChangeOn | If the scene change detection block detects a scene change and sets Flag$_{SC}$(t) to "TRUE", this flag is set to "TRUE". Once this flag is set to "TRUE", the main state machine checks the source of the scene change at C$_{IDX}$(t) = 0 or 5. The source of the scene change may be one of: "contents change in one film sequence", "film-to-film editing" or "film-to-video editing". The main state machine continues its present index transition in the first case, however, it goes to "detection phase" or re-synchronizes C$_{IDX}$(t) in the other cases. This flag is reset at C$_{IDX}$(t) = 0 or 5. |
| RelockingOn | During normal "tracking phase", the auxiliary state machine searches for a 3:2 pull-down cadence while Flag$_{ST}$(t) and Flag$_{ST}$(t − 1) are set to "TRUE" (stationary motion period). Once the auxiliary state machine finds and locks a 3:2 pull-down cadence, this flag is set to "TRUE". If this flag is "TRUE", the main state machine compares C$_{IDX}$(t) with the additional cadence index generated in the auxiliary state machine at C$_{IDX}$(t) = 0 or 5. If the indexes are different, the main state machine re-synchronizes C$_{IDX}$(t) to the index value of the auxiliary state machine and resets this flag. |
| NoMotionValueChanged | This flag is set to "TRUE" if an abrupt change of the SAD values having no motion occurs. This flag is used to detect film-to-video editing together with other internal flags. |
| 3:2CadenceOn | This flag is set to "TRUE" unless a glitch in a 3:2 pull-down cadence occurs. |
| 2:2CadenceOn | This flag is set to "TRUE" if a 2:2 cadence glitch occurs at a film-to-film editing point. |
| 3:3CadenceOn | This flag is set to "TRUE" if a 3:3 cadence glitch occurs at a film-to-film editing point. |
| 3:3CadenceHappend | This flag is set to "TRUE" if the main state machine detected a 3:3 cadence glitch and re-synchronized C$_{IDX}$(t). |
| CadenceIndexChanged | This flag is set to "TRUE" if the main state machine re-synchronized C$_{IDX}$(t). |

TABLE 3-continued

| | |
|---|---|
| CadenceOneMoreVerify | This flag is set to "TRUE" if a 3:2 pull-down cadence is confirmed while 3:2CadenceOn is "FALSE". If this flag is set to "TRUE", the main state machine checks the newly tuned 3:2 pull-down cadence again at $C_{IDX}(t) = 1$ or 6. |

Figure 16A:
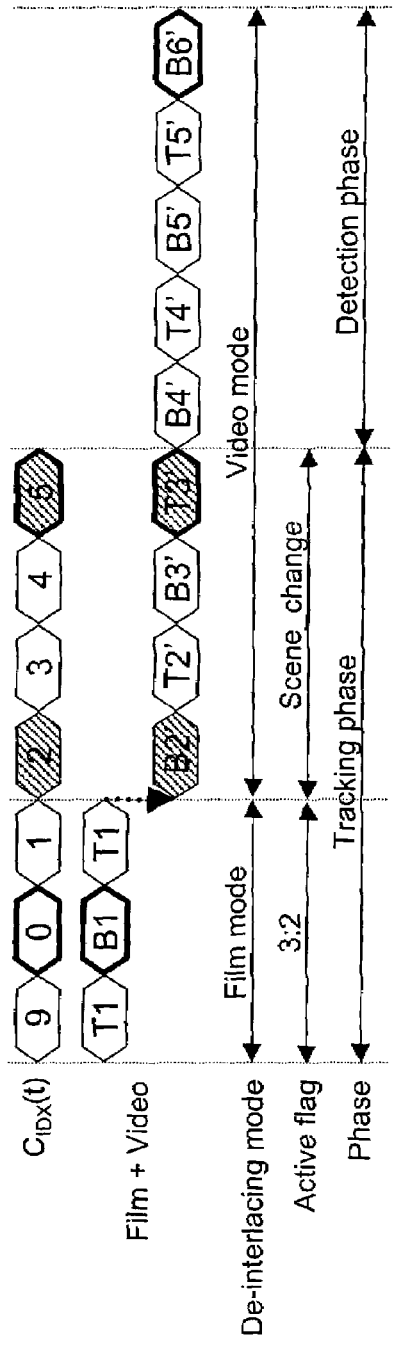
FIG. 16A shows an embodiment of a 3:2 pull-down cadence break.

FIG. 16A shows an embodiment of a 3:2 pull-down cadence break caused by film-to-video editing between T1 and B2' fields. Since the editing point causes discontinuity of scene contents, the SceneChangeOn flag is set to "TRUE" at $C_{IDX}(t)=2$ and the B2' field time. The state machine/control block resets 3:2CadenceOn to "FALSE", and changes the deinterlacing mode to select the output of the video mode interlaced-to-progressive conversion block until $C_{IDX}(t)$ becomes 5. The change in the deinterlacing mode minimizes combing artifacts. The NoMotion/Motion flag at $C_{IDX}(t)=5$ and the T3' field time will be set to the "Motion" value, since the next field (B4') is not a repetition of the previous field (B3'). When a break in the field repetition pattern of a normal film source is detected, the main state machine changes its global state to "main detection phase," to find and lock a new 3:2 pull-down cadence.

Figure 16B:
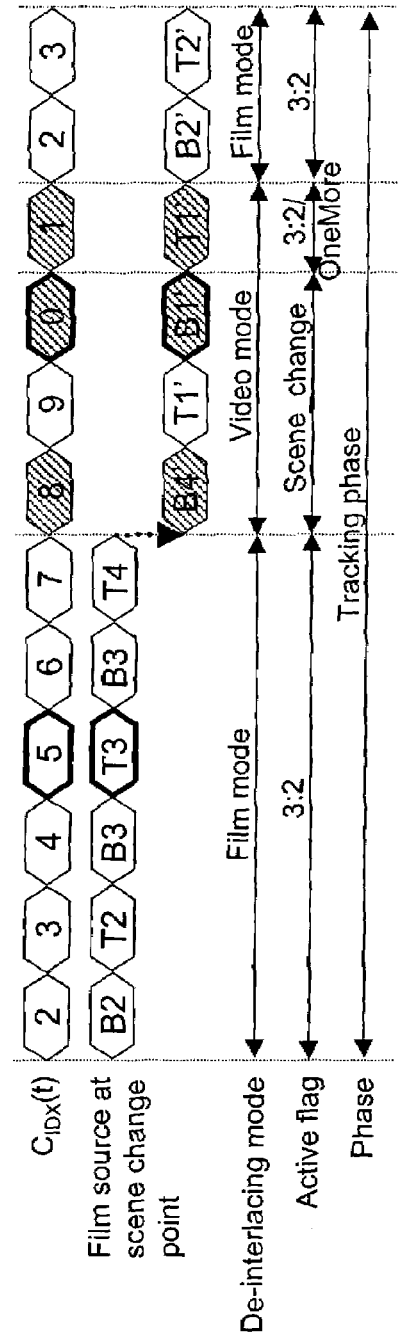
FIG. 16B shows an embodiment of a scene change.

FIG. 16B shows an embodiment of a scene change, where a change of the contents in a film sequence occurs at $C_{IDX}(t)=8$ and B4' field time. The NoMotion/Motion flag at $C_{IDX}(t)=0$ and B1' field time will be set to a "NoMotion" value, which indicates the field repetition pattern of the film sequence. The main state machine sets 3:2CadenceOn and CadenceOneMoreVerify to "TRUE". The main state machine checks whether the NoMotion/Motion flag is set to "Motion" at $C_{IDX}(t)=1$ and the T1' field time, and continues the film mode deinterlacing if the flag is set to "Motion".

Figure 17A:
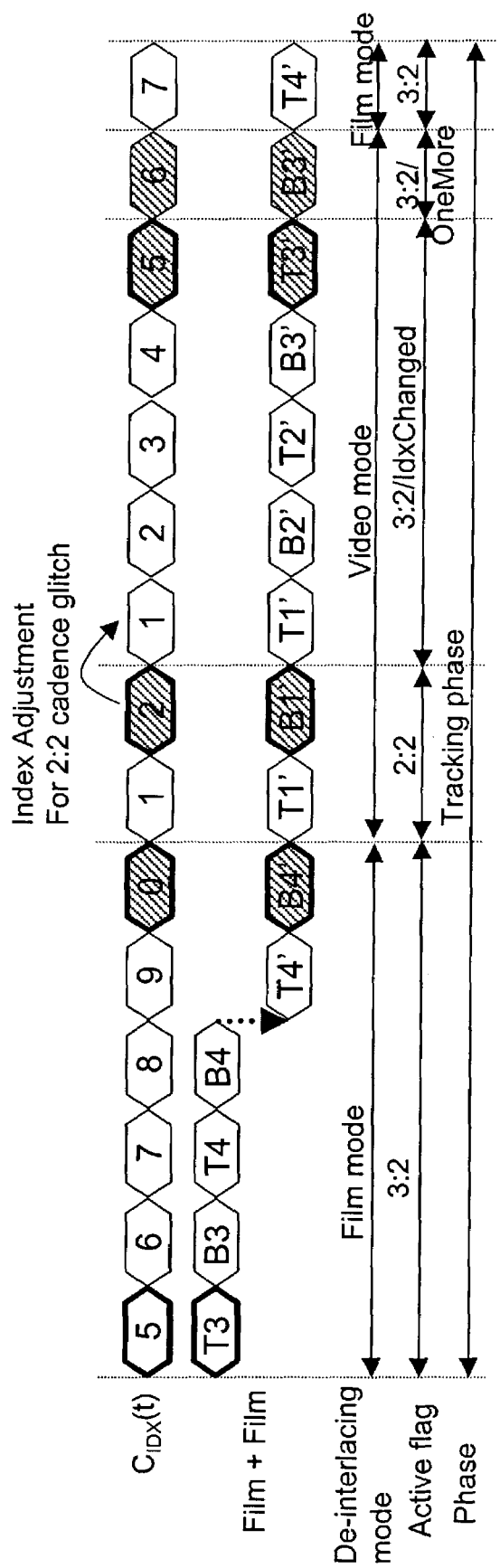
FIGS. 17A, 17B, and 17C show embodiments of cadence glitch handling.
Figure 17B:
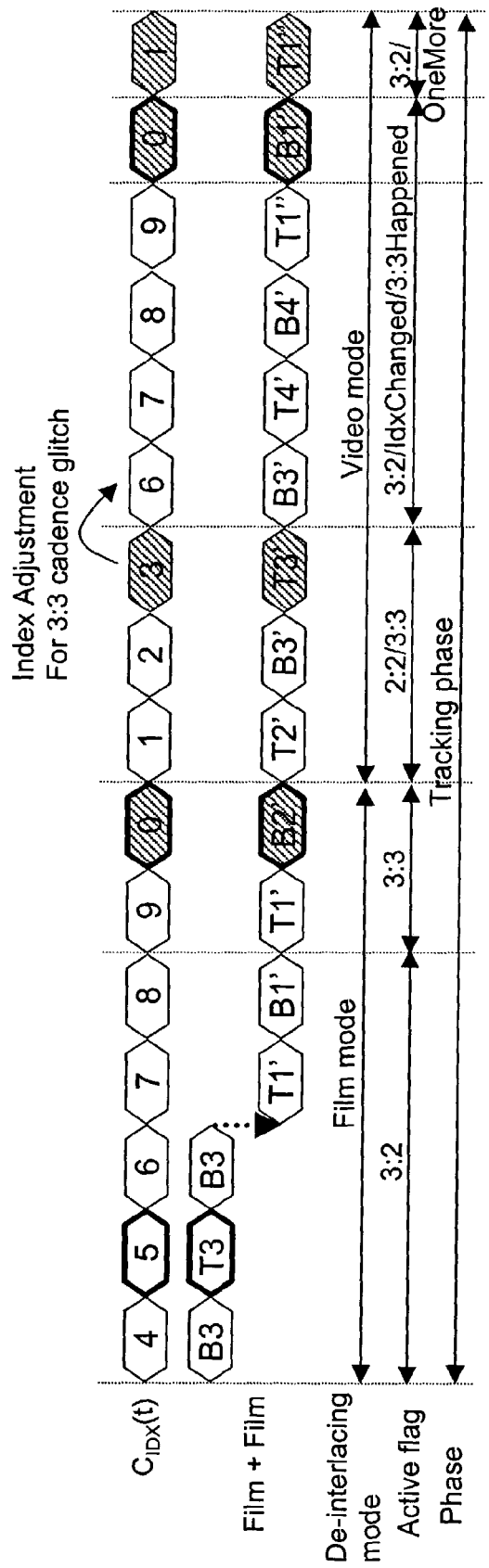
Figure 17C:
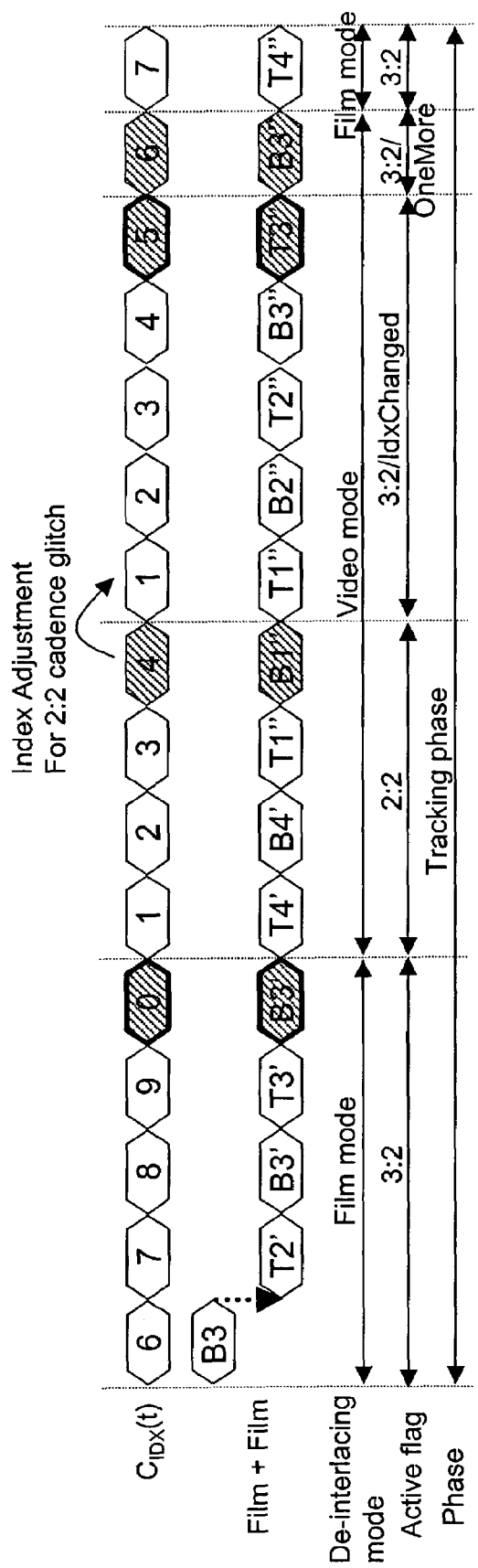

FIGS. 17A, 17B, and 17C show embodiments of how cadence glitches during "main tracking phase" are handled by the present invention. Referring now to FIG. 17A, a 2:2 cadence glitch occurs at $C_{IDX}(t)=9$ and the T4' field time. A normal field repetition pattern has a field sequence of "T1'-B1'-T1'" after a sequence of "T4-B4" fields. However, in the embodiment shown in FIG. 17A, a film sequence which begins with "T4'-B4'-T1'-B1'-T1'" field pattern was attached after "T4-B4" fields of the other film sequence during the editing of two film sources. The 2:2 cadence glitch is detected at $C_{IDX}(t)=0$ and the B4' field time, since the NoMotion/Motion flag will be set to "Motion" at the B4' field time. The main state machine changes deinterlacing mode to video mode while setting 2:2CadenceOn to "TRUE". The main state machine checks the NoMotion/Motion flag at all cadence indexes when the 2:2CadenceOn flag is set to "TRUE".

In the embodiment shown in FIG. 17A, the NoMotion/Motion flag is set to "NoMotion" at $C_{IDX}(t)=2$ and the B1' field time. In one embodiment, the main state machine checks whether the $SAD_N(t)$ is a minimum value within the most recent 7 SAD values at $C_{IDX}(t)=2$, instead of 5 SAD values. The main state machine checks 7 SAD values since the main state machine does not find a "NoMotion" value at the previous $C_{IDX}(t)=0$. If the main state machine finds a "NoMotion" value at this time, it re-synchronizes $C_{IDX}(t)$ to the field repetition pattern of the new film sequence, while changing the values of the 2:2CadenceOn, 3:2CadenceOn, and CadenceIndexChanged flags. The 2:2CadenceOn is reset to "FALSE", the 3:2CadenceOn is set to "TRUE", and the CadenceIndexChanged flag is set to "TRUE". Once the CadenceIndexChanged flag is set to "TRUE", the main state machine exits the "tracking phase" if the NoMotion/Motion flag is set to "Motion" at $C_{IDX}(t)=5$ and the T3' field time. Otherwise, the main state machine keeps the current tracking and sets CadenceOneMoreVerify to "TRUE". When the internal flags, except for the 3:2CadenceOn flag, are set to "TRUE", the main state machine selects video mode deinterlacing to remove combing artifacts. The main state machine changes from deinterlacing mode to film mode after verifying a newly tuned 3:2 pull-down cadence at $C_{IDX}(t)=6$.

FIGS. 17B and 17C show embodiments of how cadence glitches caused by different editing actions from FIG. 17A are handled. The basic handling techniques of FIG. 17B and FIG. 17C are the same as in FIG. 17A. However, the cadence index adjustment occurs at $C_{IDX}(t)=3$ in FIG. 17B and at $C_{IDX}(t)=4$ in FIG. 17C. It is noted that the present invention handles various cadence breaks that occur with opposite field parity from FIG. 16A to FIG. 17C with similar techniques.

Figure 18:
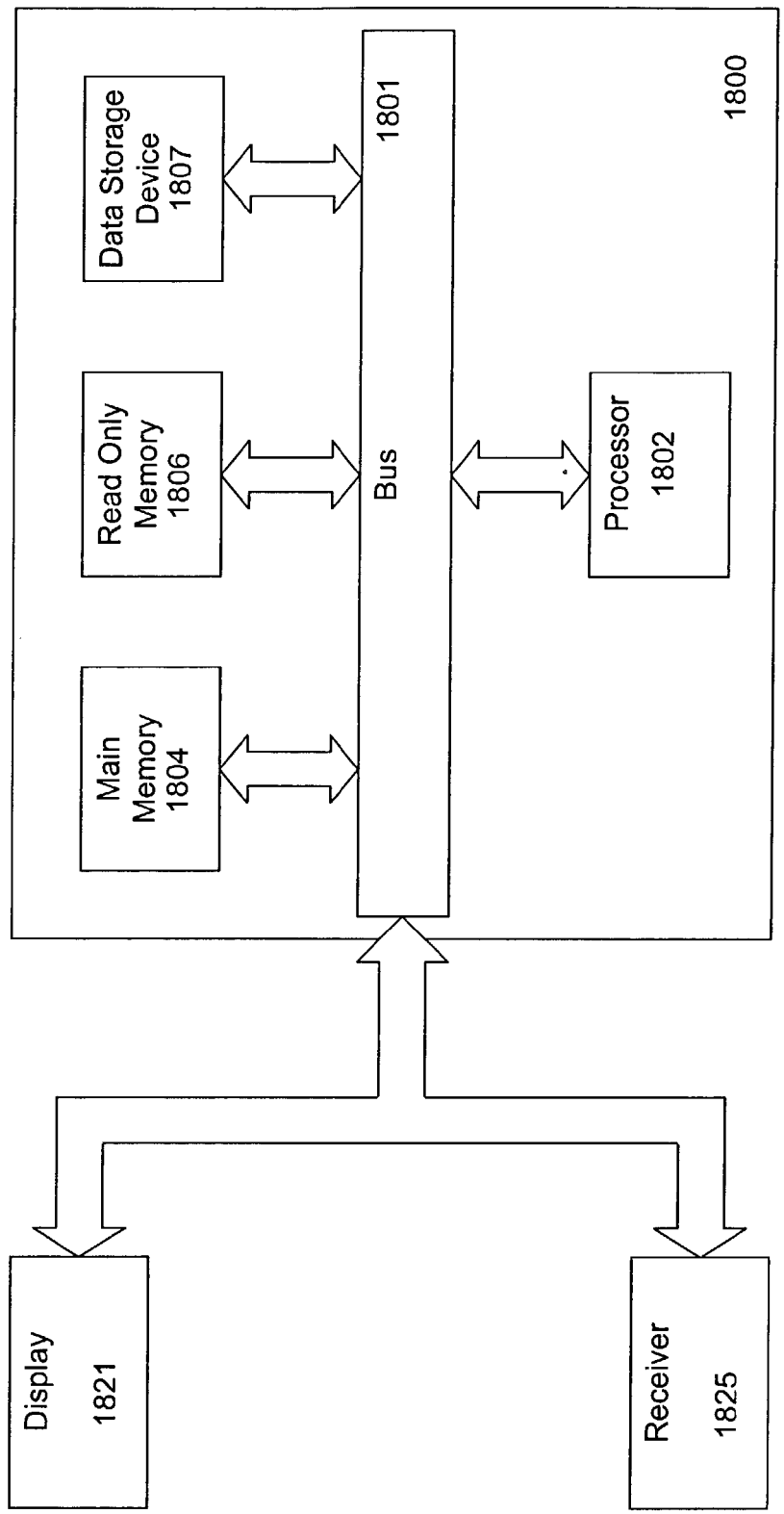
FIG. 18 is a block diagram of an embodiment of a system in which the present invention may be practiced.

FIG. 18 is a block diagram of an embodiment of a system 1800 in which the present invention may be practiced. It will be apparent to those of ordinary skill in the art, however, that other alternative systems of various system architectures may also be used.

System 1800 includes a bus or other communication means 1801 for communicating information, and a processing means such as processor 1802 coupled with bus 1801 for processing information. System 1800 further includes a random access memory (RAM) or other dynamic storage device 1804 (referred to as main memory), coupled to bus 1801 for storing information and instructions to be executed by processor 1802. Main memory 1804 also may be used for storing temporary variables or other intermediate information during execution of instructions by processor 1802. System 1800 also includes a read only memory (ROM) and/or other static storage device 1806 coupled to bus 1801 for storing static information and instructions for processor 1802.

A data storage device 1807 such as a magnetic disk or optical disc and its corresponding drive may also be coupled to system 1800 for storing information and instructions. System 1800 may also be coupled via bus 1801 to a display device 1821, such as a cathode ray tube (CRT), a Liquid Crystal Display (LCD), a plasma display, a rear projection display, a front projection display or a HD capable display, such as an HDTV for displaying information to an end user. It will be apparent to those of ordinary skill in the art, however that various other alternative display devices may also be used. For example, in one embodiment of the present invention, a deinterlaced video signal may be displayed as a progressive scan video signal on a progressive scan display device 1821. In one embodiment, system 1800 may be coupled to a set top box.

A receiver 1825 may be coupled to bus 1801. The receiver 1825 may include an antenna, a coaxial cable, a satellite, component, composite or S-Video connectors, or other well known interface devices for receiving a video signal.

In one embodiment, software may be used to facilitate the methods of the present invention, and may be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

The present invention may be embodied in firmware logic. In one embodiment, the present invention may be implemented in hardware, by using, for example, an application specific integrated circuit (ASIC). In one embodiment, the present invention may be embodied in a decoder chip. In one embodiment, the present invention may be embodied in a set-top box. In one embodiment, the present invention may be embodied in a television set.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for deinterlacing a video signal comprising:
   calculating frame differences;
   determining a scene change threshold based on the frame differences;
   detecting a scene change based on the frame differences and the scene change threshold;
   determining a stationary motion threshold based on the frame differences;
   detecting stationary motion based on the frame differences and the stationary motion threshold;
   detecting a mode of the video signal based on the frame differences; and
   selecting a deinterlacing algorithm based on the mode of the video signal, the scene change, and the stationary motion.

2. The method of claim 1, wherein calculating frame differences comprises summing the absolute differences between corresponding pixels of two fields having a frame distance.

3. The method of claim 1, further comprising:
   calculating a first set of values based on the frame differences for subsequent scene change detection;
   storing the first set of values in a first buffer;
   calculating a second set of values based on the frame differences for subsequent stationary motion detection; and
   storing the second set of values in a second buffer.

4. The method of claim 3, further comprising storing flags in a third buffer, the flags indicating the validity of the second set of values stored in the second buffer for detecting stationary motion.

5. The method of claim 1, wherein selecting the deinterlacing algorithm comprises:
   selecting field jamming when a film mode is detected; and
   selecting motion-based deinterlacing when a video mode is detected.

6. The method of claim 5, wherein selecting field jamming comprises determining a field jamming direction.

7. The method of claim 3, wherein the scene change threshold is determined by selecting the greater of a scaled weighted average of the first set of values and a low-bound motion threshold.

8. The method of claim 3, wherein the scene change threshold is determined according to the following equation, $$Th = \text{Max}[ScF * Wavg_{SC}(t), THL_{SC}],$$

wherein Th is the scene change threshold, ScF is a scaling factor, $Wavg_{SC}(t)$ is a weighted scaled average of the first set of values from time t, and $THL_{SC}$ is a low-bound motion threshold.

9. The method of claim 3, wherein the stationary motion threshold is based on a scaled average of the second set of values.

10. The method of claim 3, wherein the stationary motion threshold is determined according to the following equation, $$Bound_{Min}(t) = AvgMin_{Film}(t) + \text{Max}[LL_{Min}, \text{Min}[UL_{Min}, Bound_{Diff}(t)]],$$

wherein $Bound_{Min}(t)$ is the stationary motion threshold at time t, $AvgMin_{Film}(t)$ is the average noise level measured from the video signal at time t, $LL_{Min}$ is a low clamping bound, $UL_{Min}$ is an upper clamping bound, and $Bound_{Diff}(t)$ is the scaled absolute value of the difference between $AvgMin_{Film}(t)$ and the average motion based on second set of values.

11. A system comprising:
   a video signal receiver to receive an interlaced signal;
   a frame difference calculator to calculate frame differences;
   a scene change detector to determine a scene change threshold based on the frame differences, and to detect a scene change based on the frame differences and the scene change threshold;
   a stationary motion detector to determine a stationary motion threshold based on the frame differences, and to detect stationary motion based on the frame differences and the stationary motion threshold;
   a film mode detector to detect a mode of the video signal based on the frame differences, and to select a deinterlacing algorithm based on the mode of the video signal, the scene change, and the stationary motion; and
   a signal output to output a high definition signal.

12. The system of claim 11, wherein a frame difference is the sum of absolute differences between corresponding pixels of two fields having a frame distance.

13. The system of claim 11, wherein the frame difference calculator is further to calculate a first set of values based on the frame differences for subsequent scene change detection, to store the first set of values in a first buffer, to calculate a second set of values based on the frame differences for subsequent stationary motion detection, and to store the second set of values in a second buffer.

14. The system of claim 13, further comprising a flag buffer to store flags, the flags indicating the validity of the second set of values stored in the second buffer for detecting stationary motion.

15. The system of claim 11, wherein the film mode detector is further to select field jamming when a film mode is detected, and to select motion-based deinterlacing when a video mode is detected.

16. The system of claim 15, wherein the film mode detector is further to determine a field jamming direction.

17. The system of claim 13, wherein the scene change threshold is the greater of a scaled weighted average of the first set of values and a low-bound motion threshold.

18. The system of claim 13, wherein the scene change threshold is determined according to the following equation, $$Th = \text{Max}[ScF * \text{Wavg}_{SC}(t), THL_{SC}],$$

wherein Th is the scene change threshold, ScF is a scaling factor, $\text{Wavg}_{SC}(t)$ is a weighted scaled average of the first set of values from time t, and $THL_{SC}$ is a low-bound motion threshold.

19. The system of claim 13, wherein the stationary motion threshold is based on a scaled average of the second set of values.

20. The system of claim 13, wherein the stationary motion threshold is determined according to the following equation, $$\text{Bound}_{Min}(t) = \text{AvgMin}_{Film}(t) + \text{Max}[LL_{Min}, \text{Min}[UL_{Min}, \text{Bound}_{Diff}(t)]],$$

wherein $\text{Bound}_{Min}(t)$ is the stationary motion threshold at time t, $\text{AvgMin}_{Film}(t)$ is the average noise level measured from the video signal at time t, $LL_{Min}$ is a low clamping bound, $UL_{Min}$ is an upper clamping bound, and $\text{Bound}_{Diff}(t)$ is the scaled absolute value of the difference between $\text{AvgMin}_{Film}(t)$ and the average motion based on second set of values.

21. A method for deinterlacing a video signal comprising:
  receiving a video signal;
  calculating frame differences from the video signal;
  accumulating a first set of frame differences for scene change detection;
  storing the first set of frame differences in a first buffer;
  accumulating a second set of frame differences for stationary motion detection;
  storing the second set of frame differences in a second buffer;
  storing flags in a third buffer, the flags indicating the validity of each frame difference stored in the first buffer;
  controlling data shift in the first, second and third buffers;
  detecting a mode of the video signal, wherein the mode is detected based on the buffered frame differences and flags;
  tracking the video signal across multiple fields if a film mode is detected; managing cadence index transition;
  detecting a scene change based on a scene change threshold, the scene change threshold based on the first set of frame differences;
  detecting a stationary motion based on a stationary motion threshold, the stationary motion threshold based on the second set of frame differences;
  determining a field jamming direction; and
  selecting a deinterlacing algorithm based on a detected mode of the video signal, scene change, and stationary motion.

22. The method of claim 21, wherein field jamming is selected as the deinterlacing algorithm when a film mode is detected, and wherein motion-based deinterlacing is selected as the deinterlacing algorithm when a video mode is detected.

23. An apparatus for deinterlacing a video signal comprising:
  means for calculating frame differences;
  means for determining a scene change threshold based on the frame differences;
  means for detecting a scene change based on the frame differences and the scene change threshold;
  means for determining a stationary motion threshold based on the frame differences;
  means for detecting stationary motion based on the frame differences and the stationary motion threshold;
  means for detecting a mode of the video signal based on the frame differences; and
  means for selecting a deinterlacing algorithm based on the mode of the video signal, the scene change, and the stationary motion.

24. The apparatus of claim 23, wherein the means for calculating frame differences comprises means for summing the absolute differences between corresponding pixels of two fields having a frame distance.

25. The apparatus of claim 23, further comprising:
  means for calculating a first set of values based on the frame differences for subsequent scene change detection;
  means for storing the first set of values in a first buffer;
  means for calculating a second set of values based on the frame differences for subsequent stationary motion detection; and
  means for storing the second set of values in a second buffer.

26. The apparatus of claim 25, further comprising means for storing flags in a third buffer, the flags indicating the validity of the second set of values stored in the second buffer for detecting stationary motion.

27. The apparatus of claim 23, wherein the means for selecting the deinterlacing algorithm comprises:
  means for selecting field jamming when a film mode is detected; and
  means for selecting motion-based deinterlacing when a video mode is detected.

28. The apparatus of claim 23, wherein the means for selecting field jamming comprises means for determining a field jamming direction.

29. The apparatus of claim 25, wherein the scene change threshold is determined by selecting the greater of a scaled weighted average of the first set of values and a low-bound motion threshold.

30. The apparatus of claim 25, wherein the scene change threshold is determined according to the following equation, $$Th = \text{Max}[ScF * \text{Wavg}_{SC}(t), THL_{SC}],$$

wherein Th is the scene change threshold, ScF is a scaling factor, $\text{Wavg}_{SC}(t)$ is a weighted scaled average of the first set of values from time t, and $THL_{SC}$ is a low-bound motion threshold.

31. The apparatus of claim 25, wherein the stationary motion threshold is based on a scaled average of the second set of values.

32. The apparatus of claim 25, wherein the stationary motion threshold is determined according to the following equation, $$\text{Bound}_{Min}(t) = \text{AvgMin}_{Film}(t) + \text{Max}[LL_{Min}, \text{Min}[UL_{Min}, \text{Bound}_{Diff}(t)]],$$

wherein $\text{Bound}_{Min}(t)$ is the stationary motion threshold at time t, $\text{AvgMin}_{Film}(t)$ is the average noise level measured from the video signal at time t, $LL_{Min}$ is a low clamping bound, $UL_{Min}$ is an upper clamping bound, and $\text{Bound}_{Diff}(t)$ is the scaled absolute value of the difference between $\text{AvgMin}_{Film}(t)$ and the average motion based on second set of values.

* * * * *